United States Patent
Sihlbom et al.

(10) Patent No.: US 10,764,946 B2
(45) Date of Patent: Sep. 1, 2020

(54) AUTONOMOUS MESH TOPOLOGY

(71) Applicant: Vivint, Inc., Provo, UT (US)

(72) Inventors: Bjorn Ulf Anders Sihlbom, Frolunda (SE); Michael John Hart, San Jose, CA (US); Stephen John Haynes, Provo, UT (US); Jason Hruban, Pleasant Grove, UT (US); Andreas Wolfgang, Torslanda (SE)

(73) Assignee: Vivint Wireless, Inc., Provo, UT (US)

( * ) Notice: Subject to any disclaimer, the term of this patent is extended or adjusted under 35 U.S.C. 154(b) by 42 days.

(21) Appl. No.: 15/591,009

(22) Filed: May 9, 2017

(65) Prior Publication Data

US 2018/0332563 A1 Nov. 15, 2018

(51) Int. Cl.
| | | |
|---|---|---|
| *H04W 76/15* | (2018.01) | |
| *H04W 48/10* | (2009.01) | |
| *H04W 40/22* | (2009.01) | |
| *H04W 88/18* | (2009.01) | |
| *H04W 40/20* | (2009.01) | |
| *H04B 17/373* | (2015.01) | |
| *H04W 84/22* | (2009.01) | |
| *H04W 76/34* | (2018.01) | |

(52) U.S. Cl.
CPC .......... *H04W 76/15* (2018.02); *H04W 40/20* (2013.01); *H04W 40/22* (2013.01); *H04W 48/10* (2013.01); *H04W 88/18* (2013.01); *H04B 17/373* (2015.01); *H04W 76/34* (2018.02); *H04W 84/22* (2013.01)

(58) Field of Classification Search
CPC ..... H04W 72/02; H04W 76/15; H04W 48/10; H04W 76/34; H04W 84/22; H04W 40/20; H04W 40/22; H04W 88/18; H04B 17/373
See application file for complete search history.

(56) References Cited

U.S. PATENT DOCUMENTS 7,137,144 B1 * 11/2006 Attwood ........... H04L 29/12009
                                                                       726/13
7,570,623 B2    8/2009 Huang et al.
8,462,707 B2    6/2013 Husney
(Continued)

FOREIGN PATENT DOCUMENTS

KR    1020100066552 A    6/2010

OTHER PUBLICATIONS

Wang, X. et al., "IEEE 802.11s wireless mesh networks: Framework and challenges", Science Direct Ad Hoc Networks 6 (2008), Sep. 30, 2007, 970-984.

(Continued)

*Primary Examiner* — Ivan O LaTorre

(74) *Attorney, Agent, or Firm* — Holland & Hart, LLP

(57) ABSTRACT

Techniques are described of forming a mesh network for wireless communication. One method includes broadcasting, from a first node connected to a core network, a beacon signal, receiving a connection establishment request from a second node in response to the broadcasted beacon signal; determining a radio resource availability associated with a plurality of radios of the first node based on the connection establishment request, and establishing a connection with the second node using a radio of the plurality of radios based on the radio resource availability. In some cases, the radio resource availability may include a number of active connections associated with one or more radios of the plurality of radios of the first node.

19 Claims, 15 Drawing Sheets

(56) References Cited

U.S. PATENT DOCUMENTS

| | | | |
|---|---|---|---|
| 9,510,201 B1* | 11/2016 | Shimoon | H04W 12/06 |
| 2002/0060995 A1 | 5/2002 | Cervello et al. | |
| 2006/0198337 A1 | 9/2006 | Hoang et al. | |
| 2006/0215673 A1 | 9/2006 | Olvera-Hernandez | |
| 2007/0213012 A1 | 9/2007 | Marin et al. | |
| 2009/0024991 A1* | 1/2009 | Campbell | H04L 67/06 |
| | | | 717/173 |
| 2009/0296703 A1* | 12/2009 | Peng | H04W 76/15 |
| | | | 370/389 |
| 2012/0250603 A1* | 10/2012 | Huang | H04W 72/0486 |
| | | | 370/315 |
| 2013/0142068 A1 | 6/2013 | Marinier et al. | |
| 2013/0171991 A1* | 7/2013 | Fujino | H04W 28/08 |
| | | | 455/435.1 |
| 2014/0020119 A1* | 1/2014 | Zollinger | H04L 43/0882 |
| | | | 726/30 |
| 2015/0156749 A1* | 6/2015 | Yun | H04W 72/085 |
| | | | 455/513 |
| 2016/0135201 A1* | 5/2016 | Brahmi | H04L 5/006 |
| | | | 370/329 |
| 2016/0323812 A1* | 11/2016 | Moon | H04W 48/10 |
| 2016/0330675 A1 | 11/2016 | Reitsma et al. | |
| 2017/0127312 A1* | 5/2017 | Kang | H04W 40/08 |
| 2017/0150508 A1* | 5/2017 | Swanson | H04W 28/0247 |
| 2019/0090176 A1* | 3/2019 | Peters | H04W 48/08 |

OTHER PUBLICATIONS

PCT International Search Report for International Application No. PCT/US2018/030382, dated Sep. 17, 2018 (5 pp.).

* cited by examiner

AUTONOMOUS MESH TOPOLOGY

BACKGROUND

The following relates generally to wireless communication, and more specifically to autonomous mesh topology.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a WLAN, such as a Wi-Fi (i.e., Institute of Electrical and Electronics Engineers (IEEE) 802.11) network may include an access point (AP) that may communicate with one or more nodes. The AP may be coupled to a network, such as the Internet, and may enable a node to communicate via the network (or communicate with other devices coupled to the access point). A node may communicate with a network device bi-directionally. For example, in a WLAN, a node may communicate with an associated AP via downlink (DL) and uplink (UL). The DL (or forward link) may refer to the communication link from the AP to the node, and the UL (or reverse link) may refer to the communication link from the node to the AP.

A node, which may be an AP, may provide services and resources for a given coverage area, which may include one or more nodes. The AP may manage resources assigned to each node. For example, an AP may manage uplink and downlink resources for each node. Some wireless communication systems, however, lack the capability to form an efficient and robust network when the nodes have limited configuration information or may require complex configuration information coordination.

SUMMARY

The described techniques relate to improved methods, systems, devices, or apparatuses that support autonomous mesh topology. Generally, the described techniques relate to forming mesh networks without exchanging central configuration data between two or more nodes. The autonomous mesh topology is related to a mesh network. In some cases, the mesh network may be or include a Wi-Fi mesh network.

The mesh network, in some examples, may include a homogenous set of nodes that may form a contingent mesh network. A node in the mesh network may be aware as to whether it is connected to a core network using a wired connection. Further a node may be visible to other nodes in the mesh network based on broadcasting one or more beacons. The node may also respond to beacons from other nearby nodes. Once a node receives a beacon from another node it may acknowledge and characterize a quality of a potential communication link between itself and the other node. For example, the quality of the potential communication link may be based on a signal strength associated with the received beacon.

To form the mesh network a node may iteratively connect to one or more nodes discovered based on the received beacons. Alternatively, the node in some cases, may request a connection with a number of other nodes. For example, a node may be limited to a predetermined number of target connections N (e.g., to at least one other nodes), where N is an integer. The target connection value N may determine how much redundancy is included within the mesh network. In some cases, N may be 2, meaning that each node in the mesh network may initiate a connection up to two other nodes. Each node may, as a result, be connected to an arbitrary number of other nodes, with two of the connections being initiated from the node and the other connections being received at the node (e.g., each being initiated by one or more other nodes).

In some cases, having a predetermined number of target connections N may advantageously control connectivity within the mesh network such that a suitable amount of radio resources are allocated for each node. In addition, a search space for each node seeking to establish its target connections is also not too broad, such that the node consumes an extensive amount of time and resources evaluating potential communication links. A node may also monitor established connections to verify that a performance metric of the connections is satisfied and maintained over time. For example, a node may continuously monitor throughput, latency, or a combination thereof of an established connection. A node may in some examples, drop (e.g., cease) a connection with another node in response to a performance metric being below a threshold value.

A method of forming a mesh network for wireless communication is described. The method may include broadcasting, from a first node connected to a core network, a beacon signal; receiving a connection establishment request from a second node in response to the broadcasted beacon signal; determining a radio resource availability associated with a plurality of radios of the first node based at least in part on the connection establishment request, wherein the radio resource availability comprises a number of active connections associated with one or more radios of the plurality of radios of the first node; and establishing a connection with the second node using a radio of the plurality of radios based at least in part on determining the radio resource availability.

An apparatus for wireless communication is described. The apparatus may include a processor and memory in electronic communication with the processor. The processor and memory may be configured to broadcast, from the apparatus connected to a core network, a beacon signal; receive a connection establishment request from a second apparatus in response to the broadcasted beacon signal; determine a radio resource availability associated with a plurality of radios of the apparatus based at least in part on the connection establishment request, the radio resource availability comprises a number of active connections associated with one or more radios of the plurality of radios of the apparatus; and establish a connection with the second apparatus using a radio of the plurality of radios based at least in part on determining the radio resource availability.

Another apparatus for wireless communication is described. The apparatus may include means for broadcasting a beacon signal; means for receiving a connection establishment request from a node in response to the broadcasted beacon signal; means for determining a radio resource availability associated with a plurality of radios of a first node based at least in part on the connection establishment request, the radio resource availability comprises a number of active connections associated with one or more radios of the plurality of radios of the first node; and means for establishing a connection with the second node using a radio of the plurality of radios based at least in part on determining the radio resource availability.

A non-transitory computer readable medium for wireless communication is described. The non-transitory computer-readable medium may include instructions operable to cause a processor to broadcast a beacon signal; receive a connection establishment request in response to the broadcasted beacon signal; determine a radio resource availability associated with a plurality of radios based at least in part on the connection establishment request, the radio resource availability comprises a number of active connections associated with one or more radios of the plurality of radios; and establish a connection using a radio of the plurality of radios based at least in part on determining the radio resource availability.

Some examples of the method, apparatus, and non-transitory computer-readable medium described above may further include processes, features, means, or instructions for determining that the number of active radio connections associated with the first node is below a threshold number; identifying the radio of the plurality of radios of the first node as available to establish the connection with the second node based at least in part on the determining; and allocating available resources to the identified radio for establishing the connection with the second node based at least in part on the identifying. In some examples of the method, apparatus, and non-transitory computer-readable medium described above, establishing the connection is in response to the allocating.

In some examples of the method, apparatus, and non-transitory computer-readable medium described above, establishing the connection with the second node comprises establishing, in response to an establishment connection request of the first node, the connection using the radio. Some examples of the method, apparatus, and non-transitory computer-readable medium described above may further include processes, features, means, or instructions for scanning for a plurality of beacon signals using the one or more radios of the plurality of radios; and receiving the plurality of beacon signals from a plurality of nodes based at least in part on the scanning.

Some examples of the method, apparatus, and non-transitory computer-readable medium described above may further include processes, features, means, or instructions for analyzing a performance metric of each of the plurality of beacon signals; determining a potential link quality between the first node and each of the plurality of nodes based at least in part on analyzing the performance metric; selecting a node of the plurality of nodes based at least in part the potential link quality of the selected node; and establishing a second connection between the first node and the selected node.

Some examples of the method, apparatus, and non-transitory computer-readable medium described above may further include processes, features, means, or instructions for monitoring an active link quality between the first node and the second node or the selected node; and terminating the established connection between the first node and the second node or the established second connection between the first node and the selected node based at least in part on the active link quality of the connection exceeding a threshold value or the second connection exceeding the threshold value.

Some examples of the method, apparatus, and non-transitory computer-readable medium described above may further include processes, features, means, or instructions for identifying selected links between each of a plurality of nodes; identifying a performance metric of each of the selected links; and generating a routing algorithm associated with the mesh network based at least in part on the selected links and the performance metric of each of the selected links.

Some examples of the method, apparatus, and non-transitory computer-readable medium described above may further include processes, features, means, or instructions for forming a first basic service plurality (BSS) comprising the first node and the second node based at least in part on establishing the connection, wherein the first node is a control point of the first BSS. Some examples of the method, apparatus, and non-transitory computer-readable medium described above may further include processes, features, means, or instructions for configuring resources of the radio of the plurality of radios of the first node for establishing a second connection with a second BSS; receiving, via the radio, a second beacon signal from a third node in the second BSS; establishing the second connection with the third node based at least in part on the received second beacon signal; and forming a BSS mesh comprising the first BSS and the second BSS based at least in part on the second connection, wherein forming the BSS mesh comprises linking the first BSS and the second BSS at a network layer.

Some examples of the method, apparatus, and non-transitory computer-readable medium described above may further include processes, features, means, or instructions for receiving a radio resource configuration from the core network; and configuring the radio resource availability of the radio of the plurality of radios of the first node based at least in part on the received radio resource configuration. Some examples of the method, apparatus, and non-transitory computer-readable medium described above may further include processes, features, means, or instructions for identifying that the first node is connected to the second node via another radio of the plurality of radios; and discarding the establishment request from the second node based at least in part on the identifying.

Another method of forming a mesh network for wireless communication is described. The method may include receiving, at a second node, a beacon signal from a first node connected to a core network; determining, in response to the received beacon signal, a radio resource availability associated with a plurality of radios of the second node, wherein the radio resource availability comprises a number of active connections associated with one or more radios of the plurality of radios of the second node; transmitting a connection establishment request from the second node to the first node based at least in part on the radio resource availability of the second node; and establishing a connection with the first node using a radio of the plurality of radios based at least in part on the connection establishment request.

An apparatus for wireless communication is described. The apparatus may include a processor and memory in electronic communication with the processor. The processor and memory may be configured to receive at the apparatus a beacon signal from a first node connected to a core network; determine, in response to the received beacon signal, a radio resource availability associated with a plurality of radios of the apparatus, the radio resource availability comprises a number of active connections associated with one or more radios of the plurality of radios of the apparatus; transmit a connection establishment request from the apparatus to the first node based at least in part on the radio resource availability of the second node; and establish a connection with the first node using a radio of the plurality of radios based at least in part on the connection establishment request.

Another apparatus for wireless communication is described. The apparatus may include means for receiving, at a second node, a beacon signal from a first node connected to a core network; means for determining, in response to the received beacon signal, a radio resource availability associated with a plurality of radios of the second node, the radio resource availability comprises a number of active connections associated with one or more radios of the plurality of radios of the second node; means for transmitting a connection establishment request from the second node to the first node based at least in part on the radio resource availability of the second node; and means for establishing a connection with the first node using a radio of the plurality of radios based at least in part on the connection establishment request.

A non-transitory computer readable medium for wireless communication is described. The non-transitory computer-readable medium may include instructions operable to cause a processor to receive at second node a beacon signal from a first node connected to a core network; determine, in response to the received beacon signal, a radio resource availability associated with a plurality of radios of the second node, the radio resource availability comprises a number of active connections associated with one or more radios of the plurality of radios of the second node s; transmit a connection establishment request from the second node to the first node based at least in part on the radio resource availability of the second node; and establish a connection with the first node using a radio of the plurality of radios based at least in part on the connection establishment request.

Some examples of the method, apparatus, and non-transitory computer-readable medium described above may further include processes, features, means, or instructions for determining a connection to the core network based at least in part on the established connection with the first node; and enabling beacon signaling and radio resource availability transmission on an idle radio of the second node based at least in part on determining the connection to the core network.

Some examples of the method, apparatus, and non-transitory computer-readable medium described above may further include processes, features, means, or instructions for determining that the number of active radio connections associated with the second node is below a threshold number; identifying the radio of the plurality of radios of the second node as available to establish the connection with the first node based at least in part on the determining; allocating available resources to the identified radio for establishing the connection with the first node based at least in part on the identifying. In some examples of the method, apparatus, and non-transitory computer-readable medium described above, establishing the connection is in response to the allocating.

Some examples of the method, apparatus, and non-transitory computer-readable medium described above may further include processes, features, means, or instructions for analyzing a performance metric of each of a plurality of beacon signals; determining a potential link quality between the second node and each of a plurality of nodes associated with the plurality of beacon signals based at least in part on analyzing the performance metric; selecting a node of the plurality of nodes based at least in part on the potential link quality of the selected node; and establishing a second connection between the second node and the selected node. Some examples of the method, apparatus, and non-transitory computer-readable medium described above may further include processes, features, means, or instructions for determining that the number of active radio connections associated with the second node is above a threshold number; and refraining from establishing the second connection with the selected node based at least in part on the determining.

In some examples of the method, apparatus, and non-transitory computer-readable medium described above, the performance metric comprises a channel quality indicator (CQI), a received signal strength indicator (RSSI), a signal-to-noise-ratio (SNR) indicator, or any combination thereof. Some examples of the method, apparatus, and non-transitory computer-readable medium described above may further include processes, features, means, or instructions for determining a lack of a connection to the core network based at least in part on the established connection with the first node; and ending the established connection with the first node based at least in part on determining the lack of the connection to the core network. Some examples of the method, apparatus, and non-transitory computer-readable medium described above may further include processes, features, means, or instructions for scanning for a plurality of beacon signals using one or more radios of a plurality of radios; and receiving a plurality of beacon signals from a plurality of nodes based at least in part on the scanning.

Some examples of the method, apparatus, and non-transitory computer-readable medium described above may further include processes, features, means, or instructions for forming a first basic service plurality (BSS) comprising the second node and the first node based at least in part on establishing the connection, wherein forming the first BSS based at least in part on a first radio of the plurality of radios of the first node operating in an access point mode and a first radio of the plurality of radios of the second node operating in a station mode; configuring radio resources of the plurality of radios of the second node for establishing a connection with a second BSS; receiving, via a second radio of the plurality of radios, a second beacon signal from a first radio of a third node in the second BSS, wherein the first radio of the third node is in an access point mode and the second radio of the second node is in the station mode; establishing a second connection with the third node based at least in part on the received second beacon signal; and forming a BSS mesh comprising the first BSS and the second BSS based at least in part on the second, wherein forming the BSS mesh comprises linking the first BSS and the second BSS at layer 3.

DETAILED DESCRIPTION

Figure 1:
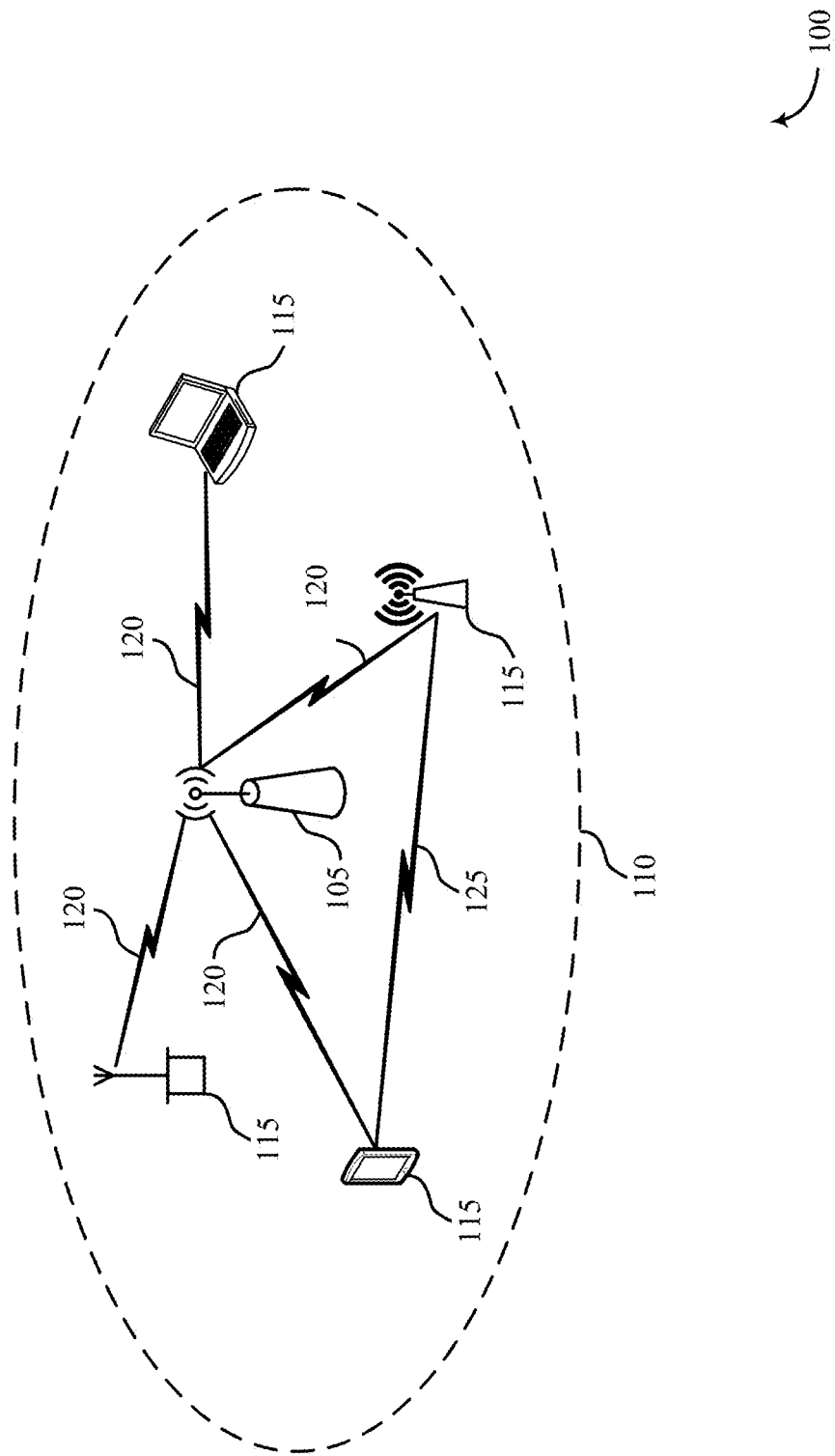
FIG. 1 illustrates an example of a system for wireless communication that supports autonomous mesh topology in accordance with aspects of the present disclosure.

Some communication systems include communication between base stations and client terminals. A base station may provide services and resources for a given geographic coverage area (i.e., a cell), which may include one or more client terminals. The base stations may manage resources assigned to each client terminal. For example, a base station may manage uplink and downlink resources for each client terminal in a given cell. Some communication systems lack the capability to form an efficient and robust network in the absence of configuration information, and these systems instead require centralized configuration information distribution.

One type of network is the mesh network, that in some cases may connect to each other to form a network without a central hierarchy. Some mesh networks provide techniques for transmission and reception of data packets through multiple nodes. These multiple nodes may be distributed over a geographic coverage area. The multiple nodes may also allow for data packets to be transmitted through multiple transmission paths to any given receiving node. Transmission paths in a mesh network may communicate data packets through wired or wireless connections. In some cases, depending on a configuration of each node in the mesh network, data packets may be transmitted to a receiving node through one or multiple possible transmission paths. The particular transmission path for a data packet may be determined by various available routing algorithms.

Moreover, some mesh networks apply functions such as neighboring node discovery and mesh topology learning for seeking nodes. However, seeking nodes in some mesh network require configuration to join the network. In some cases, seeking nodes may have limited configuration knowledge of the mesh network, and therefore may not connect to neighboring nodes effectively. It is important how these nodes connect to each other to avoid disjoint sub-networks, and ensure an efficient and robust topology. Therefore, there exists a need to improve mesh networks that includes nodes connecting to neighboring nodes effectively.

The present disclosure describes aspects of autonomous mesh topology. An autonomous mesh topology may form one or more mesh networks without a central configuring node or exchanging configuration data between two or more nodes. In some cases, the mesh network may be a Wi-Fi mesh network.

The mesh network, in some examples, may include a homogenous set of nodes that may form a contingent mesh network. A node in the mesh network may be aware as to whether it is connected to a core network using one or more connections (e.g., a wired connection, a wireless connection). Further, a node may be visible to other nodes in the mesh network based on broadcasting one or more beacons. The node may also respond to beacons from other nearby nodes. Once a node receives a beacon from another node it may acknowledge and characterize a quality of a potential communication link between itself and the other node. For example, the quality of the potential communication link may be based on a signal strength associated with the received beacon.

To form the mesh network, a node may iteratively connect to one or more nodes discovered based on the received beacons. Alternatively, the node in some cases, may request a connection with a number of other nodes. For example, a node may be limited to a predetermined number of target connections N (e.g., to at least one other nodes), where N is an integer. The target connection value N may determine how much redundancy is included within the mesh network. In some cases, N may be 2, meaning that each node in the mesh network may be connected up to two other nodes total, with two of the connections being initiated from the node and the other connections being received or accepted at the node (e.g., each being initiated by one or more other nodes).

In some cases, having a predetermined number of target connections N may advantageously control connectivity within the mesh network such that a suitable amount of radio resources are allocated for each node. In addition, a search space for each node seeking to establish its target connections is also not too broad, such that the node consumes an extensive amount of time and resources evaluating potential communication links. A node may also monitor established connections to verify that a performance metric of the connections is satisfied and maintained over time. For example, a node may continuously monitor throughput, latency, or a combination thereof of an established connection. A node may in some examples, drop (e.g., cease) a connection with another node in response to a performance metric being below a threshold value.

Aspects of the disclosure are initially described in the context of a wireless communications system. Exemplary wireless devices (e.g., STAs, nodes) network wireless devices (e.g., APs), systems, and method for forming autonomous mesh topologies are then described. Aspects of the disclosure are further illustrated by and described with reference to apparatus diagrams, system diagrams, and flowcharts that relate to autonomous mesh topology. The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a system 100 for wireless communication that supports autonomous mesh topology in accordance with aspects of the present disclosure. System 100 in some examples may be a wireless local area network (WLAN) (also known as a Wi-Fi network) configured in accordance with various aspects of the present disclosure. In some examples, system 100 may be a mesh network with least two pathways to each node, forming a net-like organization. When each node is connected to every other node, the network is said to be fully meshed. When only some of the nodes are linked, switching is required to make all the connections and the network is said to be partially meshed, or partially connected.

The system 100 may include an AP 105 and multiple associated nodes 115. In some cases, nodes 115 may represent wireless devices such as device containing a plurality of radios (e.g., 2 radios, 4 four radios), mobile stations, user equipments, personal digital assistant (PDAs), other handheld devices, netbooks, notebook computers, tablet computers, laptops, display devices (e.g., TVs, computer monitors), printers, etc. The AP 105 and the associated nodes 115 may represent a BSS or an ESS. The various nodes 115 in the network are able to communicate with one another through the AP 105. Also shown is a coverage area 110 of the AP 105, which may represent a BSA of the system 100. An extended network station (not shown) associated with the system 100 may be connected to a wired or wireless distribution system that may allow multiple APs 105 to be connected in an ESS.

In some examples, the system 100 may include a homogenous set of nodes 115 that form a contingent mesh network. Each node 115 in system 100 may be aware as to whether it is connected to a core network (e.g., through AP 105). For example, AP 105 may be connected to a core network through a wired connection. In some cases, nodes 115 may determine whether they are connected to the core network based a higher layer ping function. In some cases, nodes 115 of system 100 may be visible to each other based on broadcasting beacons. Nodes 115 may also respond to received beacons from other nodes 115.

Nodes 115 in some cases may acknowledge and characterize a quality of a communication link (e.g., wireless link 120 or wireless link 125). In some examples, nodes 115 may request a connection with a number of neighboring nodes 115. Nodes 115 may also establish and monitor a connection with a number of neighboring nodes 115. Each node 115 may identify available radio frequency resources to use for establishing connections with other neighboring nodes 115. Nodes 115 may also maintain a number of connections to other neighboring nodes 115. For example, a node 115 may be assigned a predetermined number of connections (e.g., to at least one or more nodes).

Existing nodes 115 in system 100 may also broadcast beacons. The beacons may include configuration information for nodes seeking to join a mesh network. The existing nodes 115, in some examples, may be seed nodes with a connection to a core network. For example, in mesh networks a seed node may have a physically wired or wireless connection to a network connection (e.g., DSL). The seed node may share its connection to the core network with other existing neighboring nodes in the mesh network.

In some cases, a seeking node 115 may receive the broadcasted beacons. Based on receiving the beacon, the seeking node 115 may discover existing nodes in the mesh network that are associated with the received beacons. In some examples, the seeking node 115 may establish a connection with an existing node 115 corresponding to a first received beacon. For example, a first node may broadcast a first beacon and a second node may broadcast a second beacon. Both the first node and the second node may be existing nodes in a mesh network. A seeking node looking to join a mesh network may receive the first beacon before receiving the second beacon. As a result, the seeking node may establish a connection with the first node based at least in part on the received beacon.

Seeking nodes looking to join a mesh network may evaluate received beacons to determine which corresponding node to initiate a connection with. Evaluation, in some examples, may be determined based on one or more rules applied to a received beacon. One rule for example may require that received beacon be within a threshold of a RSSI value. In some examples, a seeking node may alternatively receive a second beacon after the first beacon. However, the second beacon may satisfy the RSSI, while the first beacon may not.

As a result, the seeking node may initiate a connection with the second node instead of the first node based on the characteristic of the second beacon. Additionally or alternatively, evaluation for potential node connection may be based on one or more performance indicators. A performance indicator may include throughput, latency, latency/throughput variance, redundancy, node connection due to node mobility, or a combination thereof. Thus, nodes may iteratively attempt a connection with other discoverable nodes in a mesh network. As a result, the mesh network may be formed recursively. In some examples, the present techniques of the present disclosure provide zero coordination overhead for nodes in a mesh network.

Although not shown in FIG. 1, a node 115 may be located in the intersection of more than one coverage area 110 and may associate with more than one AP 105. A single AP 105 and an associated plurality of nodes 115 may be referred to as a BSS. An ESS is a plurality of connected BSSs. A distribution system (not shown) may be used to connect APs 105 in an ESS. In some cases, the coverage area 110 of an AP 105 may be divided into sectors (also not shown). The system 100 may include APs 105 of different types (e.g., metropolitan area, home network, etc.), with varying and overlapping coverage areas 110.

Two nodes 115 may also communicate directly via a direct wireless link regardless of whether both nodes 115 are in the same coverage area 110. Examples of direct wireless links may include Wi-Fi Direct connections, Wi-Fi Tunneled Direct Link Setup (TDLS) links, and other group connections. Nodes 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within system 100.

In some cases, a node 115 (or an AP 105) may be detectable by a central AP 105, but not by other nodes 115 in the coverage area 110 of the central AP 105. For example, one node 115 may be at one end of the coverage area 110 of the central AP 105 while another node 115 may be at the other end. Thus, both nodes 115 may communicate with the AP 105, but may not receive the transmissions of the other. This may result in colliding transmissions for the two nodes 115 in a contention based environment (e.g., CSMA/CA) because the nodes 115 may not refrain from transmitting on top of each other. A node 115 whose transmissions are not identifiable, but that is within the same coverage area 110 may be known as a hidden node. CSMA/CA may be supplemented by the exchange of an RTS packet transmitted by a sending node 115 (or AP 105) and a CTS packet transmitted by the receiving node 115 (or AP 105). This may alert other devices within range of the sender and receiver not to transmit for the duration of the primary transmission. Thus, RTS/CTS may help mitigate a hidden node problem.

Figure 2:
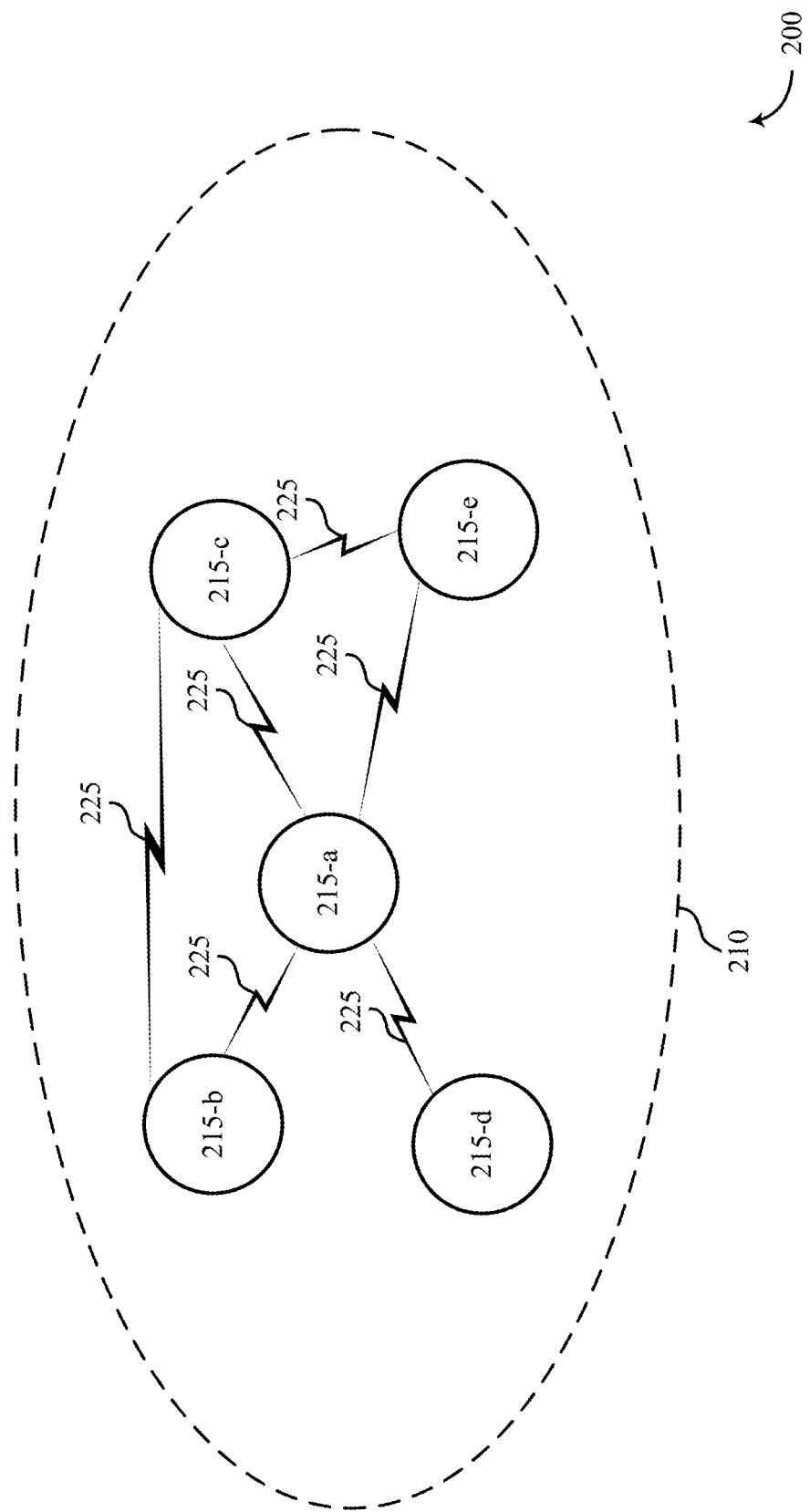
FIG. 2 illustrates an example of a system for wireless communication that supports autonomous mesh topology in accordance with aspects of the present disclosure.

FIG. 2 illustrates an example of a system 200 for wireless communication that supports autonomous mesh topology in accordance with aspects of the present disclosure. System 200 may be an example of one or more aspects of system 100 of FIG. 1. System 200 may include node 215-*a*, node 215-*b*, node 215-*c*, node 215-*d*, and node 215-*e*, which may be one or more aspects of nodes 115 as described with reference to FIG. 1. One or more nodes 215 may be in direct or indirect communication with each other via communication links 225.

System 200 may be an example of a PBSS with a geographic coverage area 210. One or more nodes 215 may connect to neighboring visible nodes 215. As such, a network where a node is visible to other neighboring nodes may be formed into a PBSS. The PBSS may be coordinated by the node visible to other neighboring nodes. Node 215-*a* may be a PBSS coordination point (PCP). In some examples, as a PCP, node 215-*a* may have a connection to each of the nodes of system 200. For example, node 215-*a* may establish and maintain a connection with node 215-*b*, node 215-*c*, node 215-*d*, and node 215-*e*. Additionally, node 215-*a* may coordinate connections between other nodes. For example, node 215-*a* may coordinate a connection between node 215-*c* and node 215-*e*, or node 215-*b* and node 215-*c*.

A PBSS may be formed by a radio of node 215-*a* because node 215-*b* may be a PCP. In some cases, a radio of node 215-*a* may act as the PCP. Node 215-*a* may also host more than one radio. In a preferred case, node 215-*a* may host four radios. The radios may be an example of 802.11ad radios. Additionally or alternatively, the radios may, in some examples, be or include mmW radios. In some cases, the mesh network may be a mmW mesh network related to New Radio (NR) (e.g., mmW communication systems) or may be a combination of a mmW mesh network and a Wi-Fi mesh network. In some examples, each radio may transmit in a different direction to facilitate forming a mesh network (WLAN mesh network, mmW mesh network, or a combination thereof). In some cases, each radio may be exclusively used to form a single PBSS. This enables each node 215 to connect to multiple PBSS networks. As a result, an arbitrary sized mesh network may be formed.

To form a PBSS, node 215-*a* may transmit beacons on one or more radios, to become visible to other nodes within geographic coverage area 210. For example, node 215-*a* may transmit beacons to node 215-*b* via communication links 225. Node 215-*a* may additionally or alternatively, transmit beacons to node 215-*b* via communication links 225. Node 215-*a* may additionally or alternatively, transmit beacons to node 215-*d* via communication links 225. Node 215-*a* may additionally or alternatively, transmit beacons to node 215-*e* via communication links 225. In some examples, any of the node 215-*b*, node 215-*c*, node 215-*d*, and node 215-*e* may alternatively serve as a PCP.

Beacons may include information indicating a desired connectivity (e.g., target connection) of a corresponding node. In some cases, a target number of connections (e.g., maximum number of connections) may be based on how many nodes can be accepted by a node (i.e., PCP). Nodes 215 may have a target number of connection to connect to a number of other nodes. The target number of connections may be represented by N, where N is an integer (e.g., 1, 2, 3 . . . N). In some cases, nodes 215 may have a predetermined number of radios. For example, each node 215 may have four radios pointed in different directions. In addition, the target number of connections for each node 215 may be an average of four connections. That is, a node 215 may have a connection with four other nodes 215. For example, node 215-*a* may have an established connection with node 215-*b*, node 215-*c*, node 215-*d*, and node 215-*e*. In some examples, one or more connections with other nodes may be initiated from the node and one or more connections may be initiated by the other node or nodes.

Additionally, the nodes associated with the target number of connections may need to have confirmed connectivity (i.e., beacons enabled and already have connections with other nodes). In some cases, nodes 215 may enable transmission of beacons on one or more of its radios based on confirming a connectivity to a core network. The one or more radios may be idle radios that do not have an active connection with another node. If a node 215 cannot confirm a connectivity to the core network, the node 215 may deactivate its radios for transmission of beacons. Node 215 may then scan for beacons from other nodes 215 to establish a connection. If a node satisfies the target number of connections, the node will be connected to at least two other nodes, both with confirmed connectivity (i.e., beacons enabled). Alternatively, a node 215 that is connected to a core network may allow new connections to be formed with other nodes by default, without seeking connections to the other nodes.

For example, node 215-*a* may be connected to a core network and may broadcast beacons on one or more of its radios. Node 215-*a* may receive a connection establishment request from a node based on the transmitted beacons. For instance, the connection establishment request may be transmitted by node 215-*b*, node 215-*c*, node 215-*d*, or node 215-*e*. Node 215-*a* may determine a radio resource availability associated with a plurality of radios. The radio resource availability may include a number of active connections. Node 215-*a* may establish a connection with a node (e.g., node 215-*b*, node 215-*c*, node 215-*d*, or node 215-*e*) based on the radio resource availability. For example, node 215-*a* may determine the radio resource availability by comparing the number of active connections to the target number of connections. If the target number of connections is not reached node 215-*a* may proceed to establish the connection with the node. Node 215-*a* may also allocate available resources to a radio associated with establishing the connection. The available resources may include a portion of a communication channel, transmit and receive power, etc.

One or more radios of nodes 215 may be configured to establish a connection, with other nodes, based on beacons initiated by the node. Alternatively or additionally, one or more radios of nodes 215 may be configured to establish a connection, with other nodes, based on beacons received from the other nodes. For example, two radios of node 215-*a* may be configured to transmit beacons to node 215-*b* and node 215-*c*, to initiate establishing a connection with these nodes. Alternatively, two other radios of node 215-*a* may be configured to scan (listen) for beacons from node 215-*d* and node 215-*e* to establish a connection with these nodes. Additionally or alternatively, all radios of a node may scan for beacons from other nodes.

Node 215-*a*, node 215-*b*, node 215-*c*, node 215-*d*, and node 215-*e*, in some cases, may scan for beacons based on 802.11ad radio capability. In some examples, if any of the node 215-*a*, node 215-*b*, node 215-*c*, node 215-*d*, and node 215-*e* cannot establish the target number of connections, the node may perform a new scan for beacons and attempt new connections such that to satisfy the target number of connections. In some cases, scanning for beacons by node 215-*a*, node 215-*b*, node 215-*c*, node 215-*d*, or node 215-*e* may be for a preconfigured scanning interval. The scanning interval may be assigned by an operator of a node or predetermined based on the node's operating specification.

Each node 215-*a*, node 215-*b*, node 215-*c*, node 215-*d*, and node 215-*e* may establish a connection with another node based on a potential link quality. That is, a node will attempt to establish a connection with another node that has a best potential link quality. For example, node 215-*d* may receive beacons from both node 215-*a* and node 215-*b*. Node 215-*d* may analyze a potential link quality associated with node 215-*a* and node 215-*b*. The potential link quality maybe based on the corresponding received beacons from node 215-*a* and node 215-*b*. For example, node 215-*d* may analyze a performance metric of a beacon received from node 215-*a* and node 215-*b*. The performance metric may include a channel quality indicator (CQI), a received signal strength indicator (RSSI), a signal-to-noise-ratio (SNR) indicator, or any combination thereof. Node 215-*d* may determine that the potential link quality with node 215-*a* is better than the potential link quality with node 215-*b* based on the analysis. As a result, node 215-*d* may select to establish a connection with node 215-*a*. In some examples, one or more nodes of system 200 may be configured to monitor and update a routing algorithm for the network. A node may monitor and update a routing algorithm based on identifying selected links between nodes 215. Additionally the node may identify a performance metric of each of the selected links, and generate a routing algorithm associated with the mesh network based on the selected links and the performance metric of each of the selected links. The routing algorithm may, in some cases, be a higher layer algorithm.

Each node 215 may attempt to connect on far end nodes with a best link quality (i.e., a link quality above a threshold). If connection attempts fail, a second best found link may selected. In other words, one or more link qualities associated with one or more nodes may be assigned a priority or score level. The priority or score level may be an indication of the quality of the link between two nodes. In some examples, the nodes 215 may store the assigned priority or score level for links in a local storage of the node. In some examples, a node 215 may consult the assigned priority or score level when establishing new connections. For instance, if at any time a connection is dropped between a node with higher priority or score level. In some cases, the node may repeat scanning and attempting reconnection to a target node of a number of nodes in a mesh network.

Node 215-*a*, node 215-*b*, node 215-*c*, node 215-*d*, and node 215-*e* may also monitor one or more active links. For example, each of node 215-*a*, node 215-*b*, node 215-*c*, node 215-*d*, and node 215-*e* may monitor a performance metric of a corresponding communication links 225. In some cases, if a communication link exceeds or is below a threshold value, a node may terminate the communication link. After terminating the communication link, a node may enable beacons for transmission or perform a scan for beacons from other nodes, to establish a new connection.

A node may also determine whether a connection path to a core network exists based an established connection. In some cases, a node 215 may establish a connection with another node. After the connection is established, a node 215 may determine a lack of a connection to a core network. In some examples, determining that lack of the connection to the core network may be performed by transmitting a message associated with a ping function. The ping function may be designated for a core network to respond to. If a node does not receive a response to the transmitted message, the node may determine that no connection path to a core network exists. As a result, the node may drop the established connection and perform a scan for beacons, at an attempt to establish a connection with another node that has a connection path (direct or indirect) to a core network.

A connection establishment procedure between two nodes (node 215-*a*, node 215-*b*, node 215-*c*, node 215-*d*, and node 215-*e*) may fail. For instance, in the previous example, node 215-*d* may select to establish a connection with node 215-*a*. During the connection establishment procedure between the two nodes, a radio link failure may occur. For example, node 215-*a* may be a mobile node (i.e., not fixed). The radio link failure thus, in some cases, may be a result of node 215-*a* moving outside a coverage area (e.g., 210). Node 215-*d* may in some cases, initiate establishing a connection with node 215-*d* (i.e., second best identified potential link). Alternatively, node 215-*d* may perform a new scan for beacons and attempt a new connection based on a received beacon.

A node 215 may also pause scanning for beacons for a duration, in response to a previous scan. For example, node 215-*a* may perform a first scan for beacons from other nodes during a scanning interval. During the first scan, node 215-*a* may receive zero beacons. Alternatively, node 215-*a* may receive one or more beacons from other nodes, but may determine that a link quality associated with the beacons is below a threshold value (i.e., it does not satisfy a performance metric). To conserve resources such as power, channel utilization, etc. node 215-*a* may delay performing a second scan for a predetermined duration (e.g., N seconds or N minutes, where N is an integer). For example, node 215-*a* may have an internal counter, based on the internal counter reaching the predetermined duration, node 215-*a* may enable one or more of its radios to scan for beacons.

As such, node 215-*a*, node 215-*b*, node 215-*c*, node 215-*d*, and node 215-*e* may form an autonomous mesh topology based on identifying a connection to a core network, being visible to other nodes by transmitting beacons, responding to beacons from other nodes, acknowledging and characterizing a quality of a link, and establishing a connection with multiple nodes.

Figure 3:
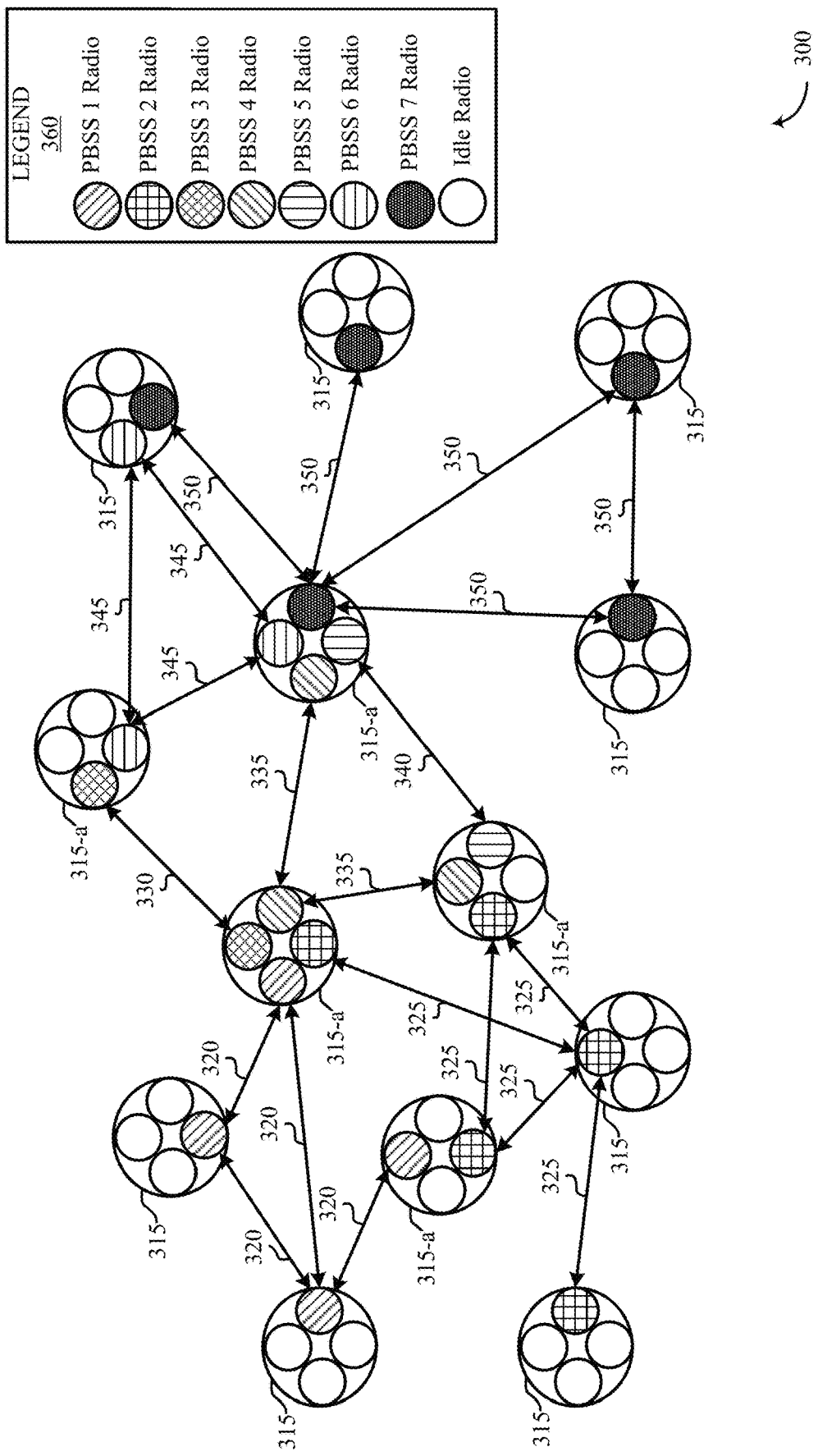
FIG. 3 illustrates an example of a system for wireless communication that supports autonomous mesh topology in accordance with aspects of the present disclosure.

FIG. 3 illustrates an example of a system 300 for wireless communication that supports autonomous mesh topology in accordance with aspects of the present disclosure. System 300 may be examples of one or more aspects of system 100 or system 200 of FIGS. 1 and 2. System 300, in some examples, may an example of multiple PBSS segments combined into a larger network. System 300 may include nodes 315 and nodes 315-*a*, which may be one or more aspects of nodes 115 or 215 as described with reference to FIGS. 1 and 2. Additionally or alternatively, the nodes may, in some examples, include mmW radios. Legend 360 highlights seven PBSS associated with system 300. Although, seven PBSS are illustrated in FIG. 3, this number should not be limited and any number of PBSS may be formed in system 300.

A seed node may begin with all radios in AP/PCP mode, and radios of other non-seed nodes may be in an idle mode (e.g., idle STA radio or idle PCP radio, or both). When a node with a STA radio connects to a PCP radio of another node, the STA radio may transition to a PCP radio. Additionally, other radios of the node may also transition to PCP mode in response to the STA radio connecting to the PCP radio. Nodes 315 may connect to neighboring visible nodes 315. As such, a network where a node is visible to radios of other neighboring nodes may be formed into a PBSS. The PBSS may be coordinated by the radio visible to other neighboring radios. In some examples, a radio of a node 315 may be a PBSS coordination point (PCP). As a PCP, the corresponding radio may establish a connection with other STA radios of nodes 315 of system 300. Additionally, in some examples, unused radios (radios not belonging to a PBSS or BSS) may be a PCP with a single radio member so that other neighboring visible nodes may connect to the network. Additionally, nodes 315 may include one or more other radios that operate as stations (STAs). As a STA, the one or more radios, are not configured to coordinate establishing connections with other nodes. The PCP radios of nodes 315 may establish connections to form a PBSS. Alternatively, all radios of nodes 315 may operate as PCPs and coordinate establishing a connection with other nodes. In some examples, STAs will transition out of an idle state. For example, in the case that a node 315 has reached a minimum number of connections, the STA will become a PCP/AP and begin sending beacons for other nodes to attach to form a new PBSS (or IBSS in the case of an AP instead of a PCP function).

System 300 may include a first PBSS. In some examples, the first PBSS may be established via a PBSS 1 radio of each of the corresponding nodes 315. Nodes 315 of the first PBSS may communicate with one another via communication link 320. To form the first PBSS, the nodes 315 of this PBSS may transmit beacons to one another. Beacons may include data indicating a desired connectivity (e.g., target connection) of a corresponding node. In some cases, the target number of connections may be based on how many nodes can be accepted by a node 315. Nodes 315 of the first PBSS may, in some cases, establish a communication link 320 in response to determining that the link quality of a communication link satisfies a performance metric. The performance metric may include a channel quality indicator (CQI), a received signal strength indicator (RSSI), a signal-to-noise-ratio (SNR) indicator, or any combination thereof.

System 300 may also include a second PBSS. In some examples, a node 315 may be associated with more than one PBSS. For example, the second PBSS may have a node 315 that has a connection to two or more PBSS. For example, as depicted in FIG. 3, one or more of nodes 315-*a* may have a connection to multiple PBSS. Nodes 315-*a* may have two radios that operate as PCPs. The second PBSS may be established via a PBSS 2 radio of each of the corresponding nodes 315. Nodes 315 of the second PBSS may communicate with one another via communication link 325.

To form the second PBSS, the nodes 315 of this PBSS may transmit beacons to one another. Beacons may include data indicating a desired connectivity (e.g., target connection) of a corresponding node 315. In some cases, the target number of connections may be based on how many nodes can be accepted by a node 315 (i.e., PCP radio). In some examples, nodes 315 may listen for beacons transmitted from another node, such as an AP. Additionally or alternatively, nodes 315 of the second PBSS may establish a communication link 325 in response to determining that the link quality of a communication link satisfies a performance metric.

In some cases, nodes 315-*a* may have a predetermined number of target connections N, as discussed elsewhere herein. The predetermined number of target connections N may determine how much redundancy is included within system 300. For example, nodes 315-*a* may have more than one connection to another visible node in system 300. In some cases, the multiple connections may be a redundant connection path to a core network. A node 315 that is connected to a core network may allow new connections to be formed with other nodes by default, without seeking connections to the other nodes. For example, a node may be in a scanning mode (e.g., attempts to gain connectivity) until it reaches the predetermined number of target connections. Once the node reaches the predetermined number of target connections, it transitions into an advertisement mode (e.g., enables transmission of beacons) where it facilitates other nodes to the joining of other nodes to the network.

System 300 may additionally include a third PBSS. The third PBSS may have a node 315 that has a connection to two or more PBSS. For example, as depicted in FIG. 3, one or more of nodes 315-*a* may have a connection to multiple PBSS. Nodes 315-*a* may have two radios that operate as PCPs. The third PBSS may be established via a PBSS 3 radio of each of the corresponding nodes 315. Nodes 315 of the third PBSS may communicate with one another via communication link 330. Additionally, to form the third PBSS, the nodes 315/315-*a* of this PBSS may transmit beacons to one another. Beacons may include data indicating a desired connectivity of a corresponding node 315. In some cases, the target number of connections may be based on how many nodes can be accepted by a node 315 (i.e., PCP radio). For example, nodes 315/315-*a* of the third PBSS may establish a communication link 330 in response to determining that the link quality satisfies a performance metric.

System 300 may, additionally or alternatively, include a fourth PBSS. The fourth PBSS may have a node 315 that has a connection to two or more PBSS. For example, one or more of nodes 315-*a* may have a connection to multiple PBSS. Nodes 315-*a* may have two radios that operate as PCPs. The fourth PBSS may be established via a PBSS 4 radio of each of the corresponding nodes 315. Nodes 315 of the fourth PBSS may communicate with one another via communication link 330.

To form the fourth PBSS, the nodes 315/315-*a* may transmit beacons to one another. Beacons may include data indicating a desired connectivity of a corresponding node 315. In some cases, the target number of connections may be based on how many nodes can be accepted by a node 315. Additionally or alternatively, nodes 315/315-*a* of the fourth PBSS may establish a communication link 335 in response to determining that the link quality of a communication link satisfies a performance metric. For instance, nodes 315/315-*a* of the fourth PBSS may establish a communication link 335 in response to determining that the link quality satisfies a performance metric.

System 300 may also include fifth PBSS. The fifth PBSS may have a node 315 that has a connection to two or more PBSS. For example, one or more of nodes 315-*a* may have a connection to multiple PBSS. Nodes 315-*a* may have two radios that operate as PCPs. The fifth PBSS may be established via a PBSS 5 radio of each of the corresponding nodes 315. Nodes 315 of the fifth PBSS may communicate with one another via communication link 330.

To form the fifth PBSS, the nodes 315/315-*a* may transmit beacons to one another. Beacons may include data indicating a desired connectivity of a corresponding node 315. In some cases, the target number of connections may be based on how many nodes can be accepted by a node 315. Additionally or alternatively, nodes 315/315-*a* of the fifth PBSS may establish a communication link 340 in response to determining that the link quality of a communication link satisfies a performance metric. For example, nodes 315/315-*a* of the fifth PBSS may establish a communication link 340 in response to determining that the link quality satisfies a performance metric.

System 300 may also include a sixth PBSS. The sixth PBSS may have a node 315 that has a connection to two or more PBSS. For example, one or more of nodes 315-*a* may have a connection to multiple PBSS. Nodes 315-*a* may have two radios that operate as PCPs. The sixth PBSS may be established via a PBSS 6 radio of each of the corresponding nodes 315. Nodes 315 of the sixth PBSS may communicate with one another via communication link 345. Additionally, to form the sixth PBSS, the nodes 315/315-*a* may transmit beacons to one another. Nodes 315/315-*a* of the sixth PBSS may establish a communication link 345 in response to determining that the link quality of a communication link satisfies a performance metric. For instance, nodes 315/315-*a* of the sixth PBSS may establish a communication link 345 in response to determining that the link quality satisfies a performance metric.

System 300 may additionally or alternatively, include a seventh PBSS. The seventh PBSS may have a node 315 that has a connection to two or more PBSS. For example, one or more of nodes 315-*a* may have a connection to multiple PBSS. Nodes 315-*a* may have two radios that operate as PCPs. The seventh PBSS may be established via a PBSS 7 radio of each of the corresponding nodes 315. Nodes 315 of the seventh PBSS may communicate with one another via communication link 350. Additionally, to form the seventh PBSS, the nodes 315/315-*a* may transmit beacons to one another. Nodes 315/315-*a* of the seventh PBSS may establish a communication link 350 in response to determining that the link quality of a communication link satisfies a performance metric. For instance, nodes 315/315-*a* of the seventh PBSS may establish a communication link 350 in response to determining that the link quality satisfies a performance metric.

Each node 315 of the first PBSS through the seventh PBSS may monitor one or more active links. For example, each of node 315/315-*a*, may monitor a performance metric of a corresponding communication link. In some cases, if a communication link exceeds or is below a threshold value, a corresponding node 315 may terminate the communication link. After terminating the communication link, the node 315 may enable beacons for transmission or perform a scan for beacons from other nodes 315, to establish a new connection. Additionally or alternatively, one, some, or each node 315 of the first PBSS through the seventh PBSS may monitor and update a routing algorithm based on identifying selected links between each nodes 315. Additionally the nodes 315 may identify a performance metric of each of the selected links, and generate a routing algorithm associated with the mesh network based on the selected links and the performance metric of each of the selected links. The routing algorithm may, in some cases, be a higher layer algorithm.

A node 315/315-*a* may also determine whether a connection path to a core network exists based an established connection. In some cases, a node 315/315-*a* may establish a connection with another node 315. After the connection is established, node 315/315-*a* may determine a lack of a connection to a core network. In some examples, determining that lack of the connection to the core network may be performed by transmitting a message associated with a ping function. The ping function may be designated for a core network to respond to. If a node 315/315-*a* does not receive a response to the transmitted message, the node 315/315-*a* may determine that no connection path to a core network exists. As a result, the node 315/315-*a* may drop the established connection and perform a scan for beacons, at an attempt to establish a connection with another node 315/315-*a* that has a connection path (direct or indirect) to a core network. In some cases, a connection establishment procedure between two or more nodes 315/315-*a* may fail. A node 315/315-*a* may perform a new scan for beacons and attempt a new connection based on a received beacon.

Figure 4:
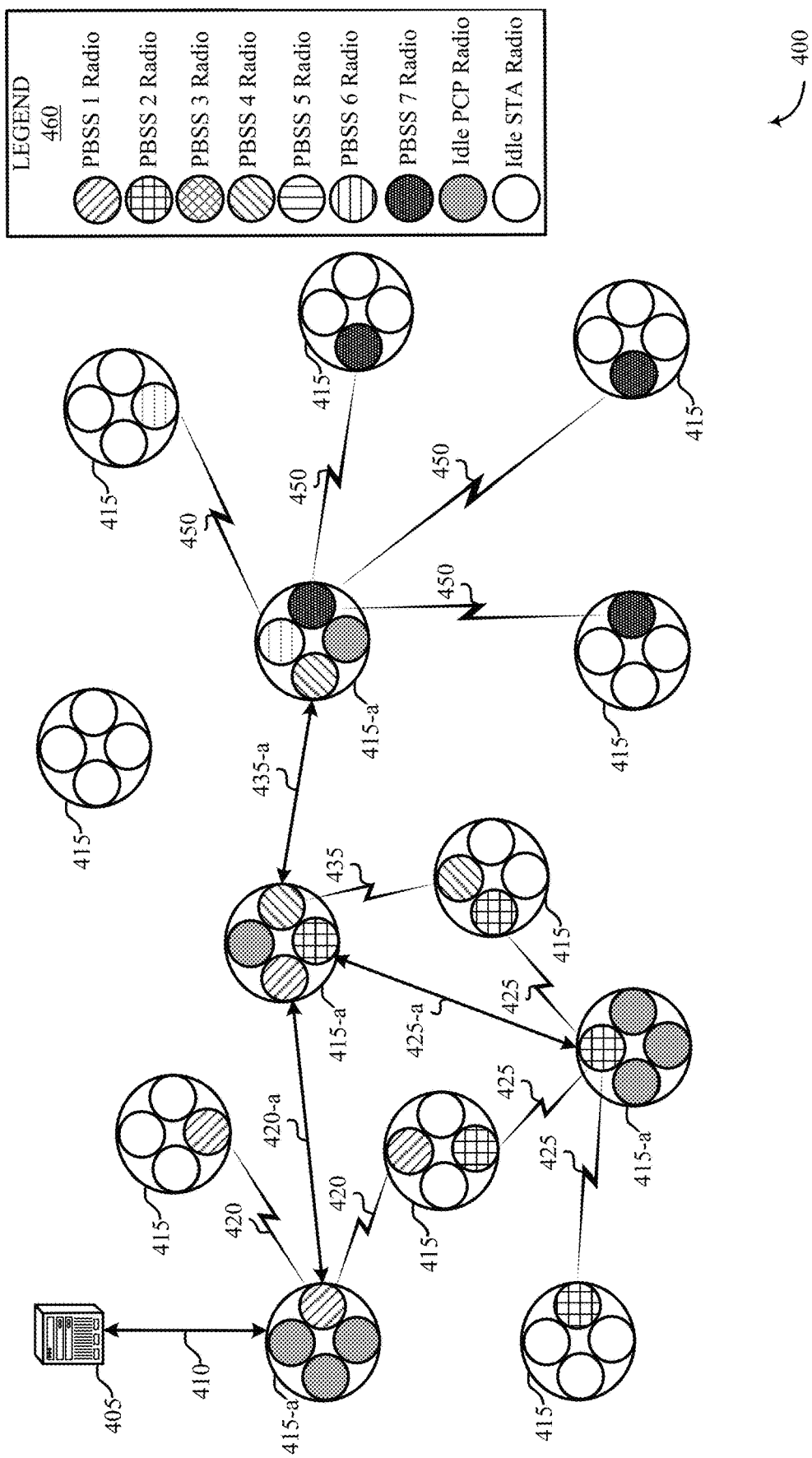
FIG. 4 illustrates an example of a system for wireless communication that supports autonomous mesh topology in accordance with aspects of the present disclosure.

FIG. 4 illustrates an example of a system 400 for wireless communication that supports autonomous mesh topology in accordance with aspects of the present disclosure. System 400 may be examples of one or more aspects of system 100 through 300 of FIGS. 1 through 3. System 400, in some examples, may include connected nodes with activated beacons on selected radios for discovery by other nodes not yet connected. Some examples of system 400 may be a mmW and mesh wireless communication system. System 400 may include a core network 405. Additionally, system 400 may include nodes 415, and nodes 415-*a*, which may be one or more aspects of nodes 115, 215, or 315/315-*a* as described with reference to FIGS. 1 through 3. Legend 460 highlights one or more radios of a node 415 and node 415-*a* configured as a PCP for system 400. The one or more radios of the nodes 415 may operate in a station mode (e.g., idle radio) or an access point mode (e.g., PBSS radio). In the station mode, the radio may listen for beacon signals transmitted from other radios (e.g., radios in access mode) associated with neighboring nodes 415. Alternatively, in the access point mode, the radio may enable transmission of beacons to other radios (e.g., of neighboring nodes 415).

Core network 405 may provide various services (e.g., subscriber services, streaming) to nodes that are connected either directly or indirectly to the core network 405. Core network 405 may also provide aggregation of service data, authentication, control/switching functionality between nodes, or act as a gateway to other networks. As illustrated in FIG. 4, a node 415-*a* may be connected to the core network 405 via communication link 410. Communication link 410 may be either a wired connection or a wireless connection. Additionally, although only one node is depicted in direct communication with core network 405, it should be understood that any number of nodes may be connected to core network 405 directly or indirectly.

A seed node (e.g., node 415-*a*) may begin with all radios in AP/PCP mode, and radios of other non-seed nodes in system 400 may be in STA mode (i.e., idle STA radio). When a node with a STA radio connects to a PCP radio of another node, the STA radio may transition to a PCP radio. Additionally, other radios of the node may also transition to PCP mode in response to the STA radio connection to the PCP radio.

Nodes 415-*a* may connect to neighboring visible nodes 415. As such, a network where a node is visible to other neighboring nodes may form a PBSS. The PBSS may be coordinated by the node visible to other neighboring nodes. In some examples, a PBSS radio of a node 415 and node 415-*a* may be a PCP. As a PCP, the corresponding PBSS radio may establish a connection with other PBSS radios of nodes 415 and 415-*a*. Additionally, nodes 415 or 415-*a* may include one or more other radios that operate as idle radios (i.e., idle STA radio or idle PCP radio). In this case, the one or more radios may operate as STAs in response to the connectivity requirement (e.g., predetermined number of target connections) not being met. Alternatively, once the connectivity requirement is met, the one or more radios may operate as a PCP/AP. As a STA, the one or more radios, are not configured to coordinate establishing connections with other nodes (e.g., nodes listen for beacons from a PCP or AP). The PBSS radios of nodes 415 and 415-*a* may establish connections to form a PBSS. Alternatively, all radios of nodes 415 and 415-*a* may operate as a PCP and coordinate establishing a connection with other nodes. In some cases, some of the nodes 415 may have beacons deactivated one or more, or all of the nodes radios.

Nodes 415-*a* may also be referred to as connected nodes. A connected node is a node that has enabled beacons on selected radios, as depicted in FIG. 4 and highlighted by legend 460. System 400 may have four connected nodes 415-*a* in communication. For example, a first connected node 415-*a* may establish a connection with a second connected node 415-*a* via communication link 420-*a*. In some examples, the second connected 415-*a* may only be a connected node once communication link 420-*a* is established, because prior to the communication link 420-*a*, the second (connected) node 415-*a* does not have a connection path to the core network 405. The second connected node 415-*a* may establish a connection with a third connected node 415-*a* via communication link 425-*a*, and a connection with fourth connected node 415-*a* via communication link 435-*a*.

In some examples, the first connected node 415-*a* may broadcast beacons on one or more of its radios based on confirming a connection with core network 405. For example, the first connected node 415-*a* may transmit a ping message to core network 405 and receive a response message from the core network 405. The first connected node 415-*a* may broadcast beacons to nodes 415 via communication links 420.

The second connected node 415-*a* may establish a connection with a third connected node 415-*a* via communication link 425-*a*. Additionally, the third connected 415-*a* may only be a connected node once communication link 425-*a* is established, because prior to the communication link 425-*a*, the third (connected) node 415-*a* does not have a connection path to the core network 405. The second connected node 415-*a* may establish a connection with a third connected node 415-*a* via communication link 425-*a*, and a connection with fourth connected node 415-*a* via communication link 435-*a*. In some examples, the second connected node 415-*a* may broadcast beacons on one or more of its radios based on confirming a connection with core network 405. For example, the second connected node 415-*a* may transmit a ping message to core network 405 and receive a response message from the core network 405. The second connected node 415-*a* may broadcast beacons to nodes 415 via communication links 435.

Additionally, the third connected node 415-*a* may broadcast beacons on one or more of its radios based on confirming a connection with core network 405. For example, the third connected node 415-*a* may transmit a ping message to core network 405 and receive a response message from the core network 405. The third connected node 415-*a* may broadcast beacons to nodes 415 via communication links 425.

The fourth connected node 415-*a* may establish a connection with the second connected node 415-*a* via communication link 435-*a*. Additionally, the fourth connected 415-*a* may only be a connected node once communication link 435-*a* is established, because prior to the communication link 435-*a*, the fourth (connected) node 415-*a* does not have a connection path to the core network 405. Additionally, the fourth connected node 415-*a* may broadcast beacons on one or more of its radios based on confirming a connection with core network 405. For example, the fourth connected node 415-*a* may transmit a ping message to core network 405 and receive a response message from the core network 405. The fourth connected node 415-*a* may broadcast beacons to nodes 415 via communication links 450.

Nodes 415-*a* may establish a connection with other nodes 415 based on a potential link quality. That is, a node 415-*a* will attempt to establish a connection with another node 415 that has a best potential link quality. For example, the connected nodes 415-*a* transmit beacons to nodes 415. The connected nodes 415-*a* may analyze a potential link quality associated with nodes 415. For example, the connected nodes 415-*a* may analyze a performance metric of potential communication links with other nodes 415. The performance metric may include a CQI, a RSSI, a SNR indicator, or any combination thereof. The connected nodes 415-*a* may select to establish a connection with one or more nodes 415 based on the performance metric. In some cases, the multiple connections may be a redundant connection path to core network 405. A node 415 or 415-*a* that is connected to core network 405 may allow automatically new connections to be formed with other nodes 415.

Figure 5:
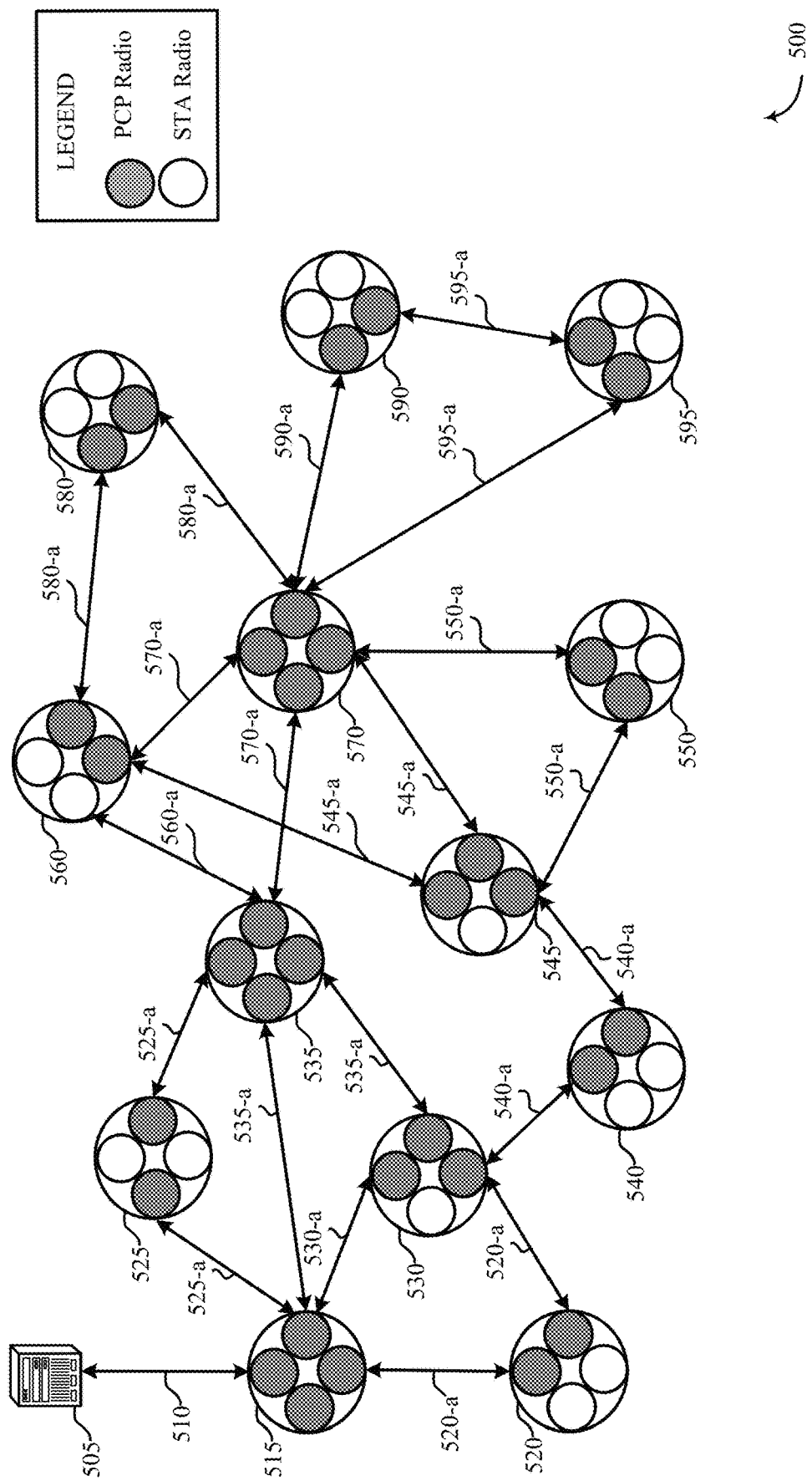
FIG. 5 illustrates an example of a system for wireless communication that supports autonomous mesh topology in accordance with aspects of the present disclosure.

FIG. 5 illustrates an example of a system 500 for wireless communication that supports autonomous mesh topology in accordance with aspects of the present disclosure. System 500 may be an examples of one or more aspects of system 100 through 400 of FIGS. 1 through 4. System 500, in some examples, may include nodes establishing connections and maintaining a number of the established connections. Some examples of system 500 may be a mmW and mesh wireless communication system. System 500 may include a core network 505. Additionally, system 500 may include node 515, node 520, node 525, node 530, node 535, node 540, node 545, node 550, node 555, node 560, node 570, node 580, node 590, and node 595, which may be one or more aspects of nodes 115, 215, 315/315-*a*, 415/415-*a* as described with reference to FIGS. 1 through 4.

Core network 505 may provide various services (e.g., subscriber services, streaming) to nodes that are connected either directly or indirectly to the core network 405. Core network 505 may also provide configuration information, aggregation of service data, authentication, control/switching functionality between nodes, or act as a gateway to other networks. Node 515 may be connected to the core network 505 via communication link 510. Communication link 510 may be either a wired connection or a wireless connection. Additionally, although only one node is depicted in direct communication with core network 505, it should be understood that any number of nodes may be connected to core network 505 directly or indirectly. Additionally, forming the network of system 500 may initiate at node 515 because of its connection to the core network 505.

In some cases, system 500 may include one or more nodes that maintain a number of connections to connected nodes. For example, node 520 may be assigned a predetermined number of connections (e.g., to at least two or more nodes) to monitor. For example, node 520 may monitor a connection to node 515 via communication link 520-*a* and a connection to node 530 via communication link 520-*a*. The connection may be between a PCP radio of node 520 and a PCP radio of node 515 and node 530. Alternatively, the connection may be between a STA radio of node 520 and a PCP radio of node 515 and node 530. In some cases, a node that maintains one or more connections may be absent any radios configured as PCP.

Node 525 may, additionally, be assigned a predetermined number of connections to monitor. For example, node 525 may monitor a connection to node 515 and node 535 via communication links 525-*a*. The connection may be between a PCP radio of node 525 and a PCP radio of node 515 and node 535. Alternatively, the connection may be between a STA radio of node 525 and a PCP radio of node 515 and node 535. Node 530 may, additionally, be assigned a predetermined number of connections to monitor. For example, node 530 may monitor a connection to node 515 via communication link 530-*a*. The connection may be between a PCP radio of node 530 and a PCP radio of node 515. Alternatively, the connection may be between a STA radio of node 530 and a PCP radio of node 515. Node 535 may, additionally, be assigned a predetermined number of connections to monitor. For example, node 535 may monitor a connection to node 515 and node 530 via communication links 535-*a*. The connection may be between a PCP radio of node 535 and a PCP radio of node 515 and node 530. Alternatively, the connection may be between a STA radio of node 535 and a PCP radio of node 515 and node 530.

In some examples, node 540 may also be assigned a predetermined number of connections to monitor. For example, node 540 may monitor a connection to node 530 and node 545 via communication links 540-a. The connection may be between a PCP radio of node 540 and a PCP radio of node 530 and node 545. Alternatively, the connection may be between a STA radio of node 540 and a PCP radio of node 530 and node 545. Node 545 may also be assigned a predetermined number of connections to monitor. For example, node 545 may monitor a connection to node 560 and node 570 via communication links 545-a. Node 550 may also be assigned a predetermined number of connections to monitor. For example, node 550 may monitor a connection to node 545 and node 570 via communication links 550-a. Additionally or alternatively, node 560 may also be assigned a predetermined number of connections to monitor. For example, node 560 may monitor a connection to node 535 via communication links 560-a. Node 570 may monitor a connection to node 560 via communication links 570-a. Node 580 may monitor a connection to node 560 and node 570 via communication links 580-a. Node 590 may monitor a connection to node 570 via communication links 590-a. In addition, node 595 monitor a connection to node 570 and node 590 via communication links 595-a.

Node 520, node 525, node 530, node 535, node 540, node 545, node 550, node 555, node 560, node 570, node 580, node 590, and node 595 may monitor a communication link based on analyzing a link quality of the communication link. Analyzing a link quality may include analyze a performance metric. The performance metric may include a CQI, a RSSI, a SNR indicator, or any combination thereof. In some cases, if a communication link exceeds or is below a threshold value, node 520, node 525, node 530, node 535, node 540, node 545, node 550, node 555, node 560, node 570, node 580, node 590, and node 595 may terminate the communication link. After terminating the communication link, node 520, node 525, node 530, node 535, node 540, node 545, node 550, node 555, node 560, node 570, node 580, node 590, and node 595 may enable beacons for transmission or perform a scan for beacons from other nodes, to establish a new connection.

Node 520, node 525, node 530, node 535, node 540, node 545, node 550, node 555, node 560, node 570, node 580, node 590, and node 595 may also determine whether a connection path to core network 505 exists based an established connection. In some examples, node 520, node 525, node 530, node 535, node 540, node 545, node 550, node 555, node 560, node 570, node 580, node 590, and node 595 may determine a lack of a connection to the core network 505 As a result, the node 520, node 525, node 530, node 535, node 540, node 545, node 550, node 555, node 560, node 570, node 580, node 590, and node 595 may drop an established connection and perform a scan for beacons, at an attempt to establish a connection with another node that has a connection path (direct or indirect) to core network 505. In some cases, the multiple connections of system 500 may be a redundant connection path to core network 505. A node 515, node 520, node 525, node 530, node 535, node 540, node 545, node 550, node 555, node 560, node 570, node 580, node 590, and node 595 that is connected to core network 505 may allow new connections to be formed with other nodes by default, without seeking connections to the other nodes.

Figure 6:
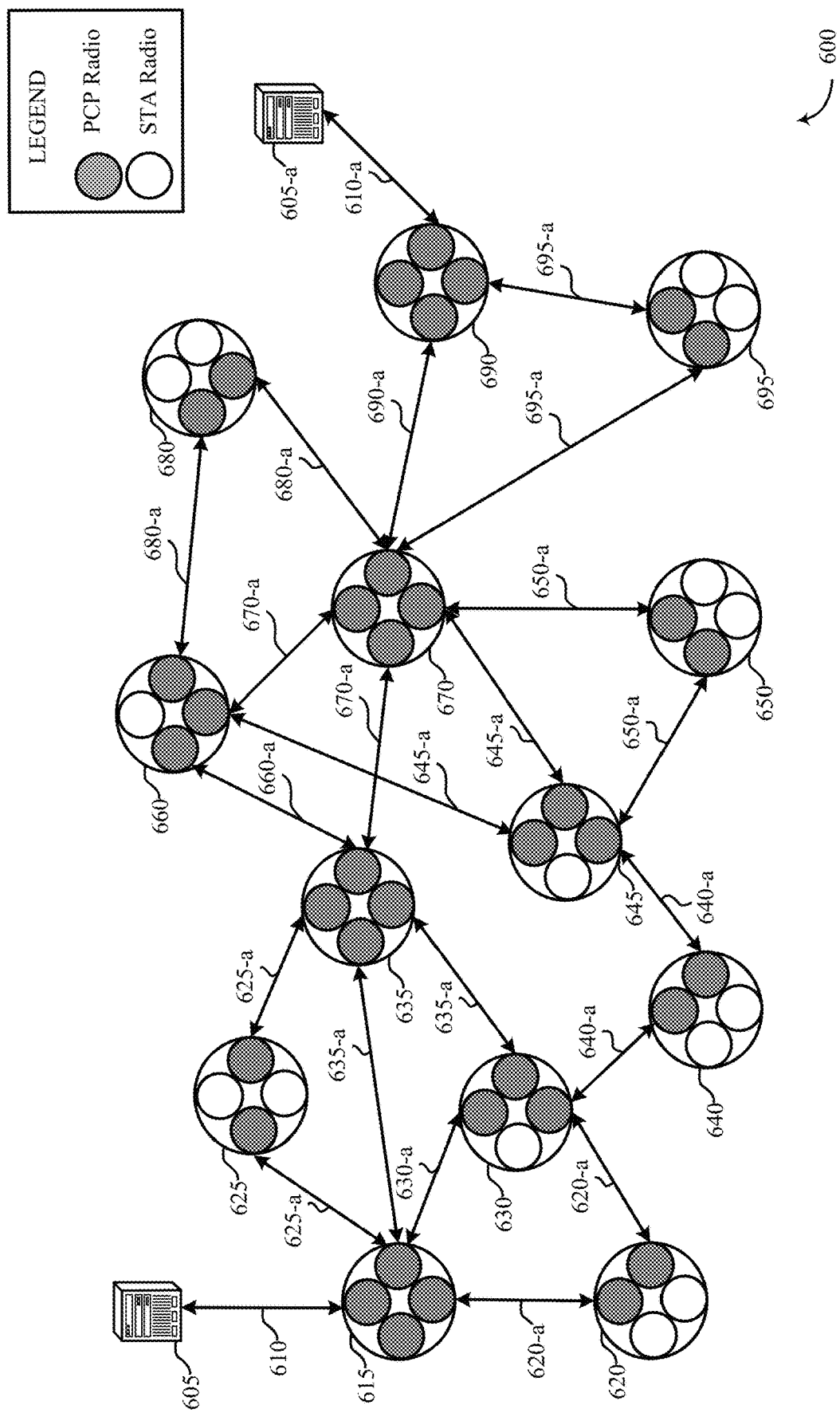
FIG. 6 illustrates an example of a system for wireless communication that supports autonomous mesh topology in accordance with aspects of the present disclosure.

FIG. 6 illustrates an example of a system 600 wireless communication that supports autonomous mesh topology in accordance with aspects of the present disclosure. System 600 may be an example of one or more aspects of system 100 through 500 of FIGS. 1 through 5. System 600, in some examples, may include nodes establishing connections and maintaining a number of the established connections. Some examples of system 600 may be a mmW and mesh wireless communication system. System 600 may include a core network 605 and a core network 605-a. Additionally, system 600 may include node 615, node 620, node 625, node 630, node 635, node 640, node 645, node 650, node 655, node 660, node 670, node 680, node 690, and node 695, which may be one or more aspects of nodes described with reference to FIGS. 1 through 5.

Core network 605 and core network 605-a may provide various services (e.g., subscriber services, streaming) to nodes that are connected either directly or indirectly to the core network 605 and core network 605-a. Core network 605 and core network 605-a may also provide aggregation of service data, authentication, control/switching functionality between nodes, or act as a gateway to other networks. Node 615 may be connected to the core network 605 via communication link 610, and node 690 may be connected to the core network 605-a via communication link 610-a. Communication link 610 and communication link 610-a may be either a wired connection or a wireless connection. Additionally, although only two nodes are depicted in direct communication with a core network, it should be understood that any number of nodes may be connected to the core network directly or indirectly.

Node 615 and node 690 may be seed nodes because of being connected to core network 605 and 605-a. A seed node (e.g., node 615 and node 690) may begin with all radios in AP/PCP mode, and radios of other non-seed nodes in system 600 may be in a STA mode. When a node with a STA radio connects to a PCP radio of another node, the STA radio may transition to a PCP radio. Additionally, other radios of the node may also transition to PCP mode. In some cases, the network (i.e., mesh network) may form starting from node 615 and node 620. To form the mesh network of system 600, node 615 and node 690 may transmit beacons on one or more radios, to become visible to other nodes. Beacons may include information indicating a desired connectivity of a corresponding node. In some cases, a target number of connections (e.g., maximum number of connections) may be based on how many nodes can be accepted by a node (i.e., PCP). Node 615 and node 690 may have a target number of connection to connect to a number of other nodes. The target number of connections may be represented by N, where N is an integer (e.g., 1, 2, 3 . . . N). In some cases, nodes of system 600 may have a predetermined number of radios. For example, each node may have four radios pointed in different directions. In addition, the target number of connections for each node of system 600 may be an average number of connections. That is, a node may have a connection with other nodes.

In some cases, having a predetermined number of target connections N may control connectivity within a mesh network such that a suitable amount of radio resources are allocated for each node of system 600. In addition, a search space for each node seeking to establish its target connections is also not too broad, such that the node consumes an extensive amount of time and resources for scanning for beacons and evaluating potential communication links. A node in system 600 may also monitor established connections to verify that a performance metric of the connections is satisfied and maintained. For example, a node may continuously monitor throughput, latency, or latency/throughput, or any combination thereof of an established connection. Therefore, as the network of system 600 expands from each seed node 515 and 590, the network may as a result form to be a single mesh network, or several smaller disjoint mesh networks, with each including at least one seed node.

Figure 7:
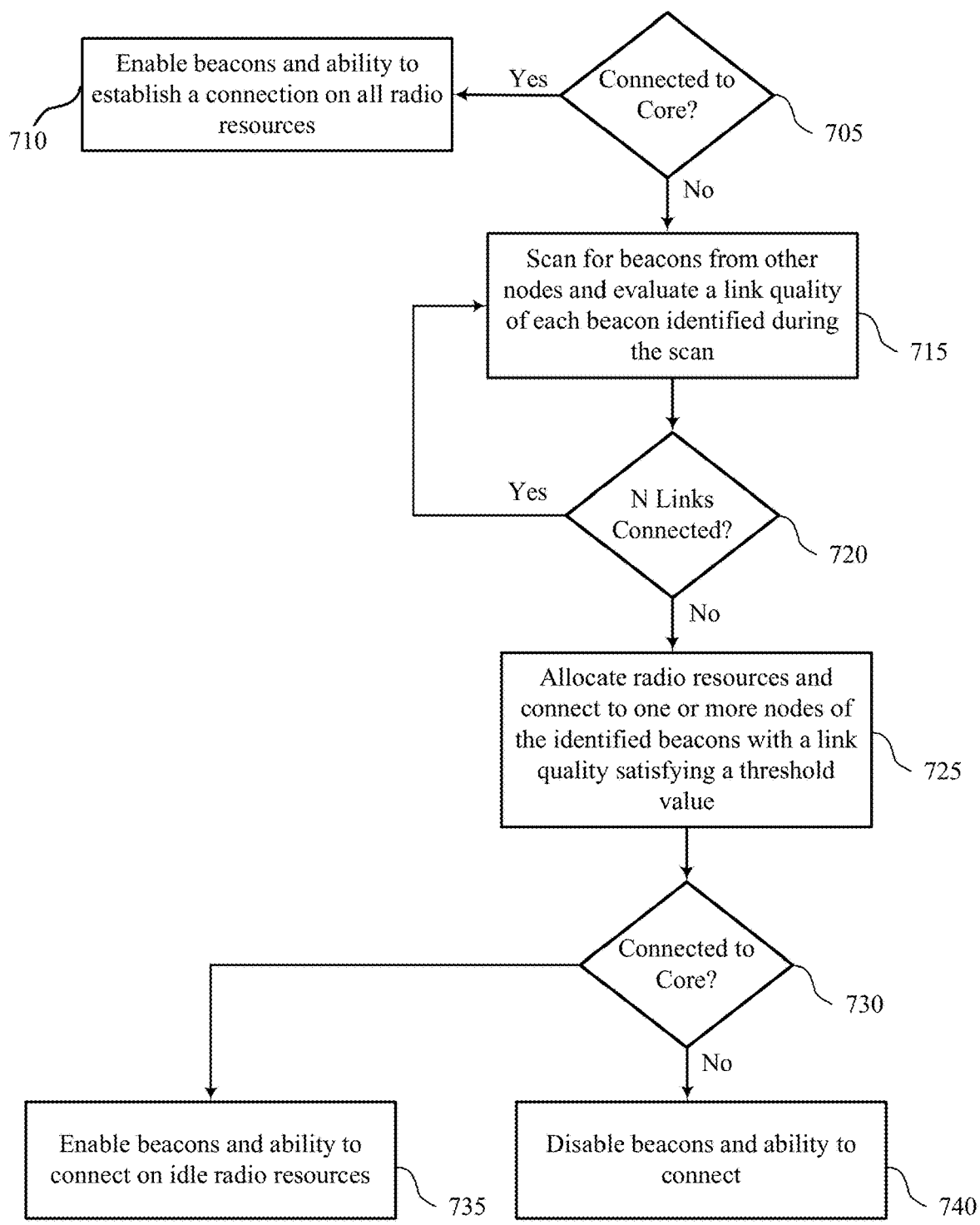
FIG. 7 illustrates an example of a method that supports autonomous mesh topology in accordance with aspects of the present disclosure.

FIG. 7 illustrates an example of a method 700 that supports autonomous mesh topology in accordance with aspects of the present disclosure. The operations of method 700 may be implemented by a node 115 or its components as described herein. For example, the operations of method 700 may be performed by a mesh communication manager as described with reference to FIGS. 8 through 11. In some examples, a node 115 may execute a plurality of codes to control the functional elements of the device to perform the functions described below. Additionally or alternatively, the node 115 may perform aspects of the functions described below using special-purpose hardware.

At 705, a node may determine whether it is connected to a core network. For example, the node may transmit a ping message and listen for a response message. The ping message may be a higher layer ping function (e.g., application layer, transport layer, network layer, link layer). At 710, the node may enable beacons and ability to establish a connection on all radio resources in response to the node determining that it is connected to the core network. The node may also enable beacons and an ability to establish a connection on a subset of radio resources. Alternatively, at 715, the node may scan for beacons from other nodes and evaluate a link quality of each beacon identified during the scan. For example, the node may evaluate the link quality of each beacon based on a performance metric. The performance metric may include throughput, latency, or latency/throughput, or any combination thereof.

At 720, the node may determine a number of connected links with other nodes. For example, a node may be limited to a predetermined number of target connections N, where N is an integer. The target connection N may determine how much redundancy is included within a mesh network. In some cases, having a predetermined number of target connections N may control connectivity within the mesh network such that a suitable amount of radio resources are allocated for each node. In addition, a search space for each node seeking to establish its target connections is also not too broad, such that the node consumes an extensive amount of time and resources for scanning for beacons and evaluating potential communication links. At 725, the node may allocate radio resources and connect to one or more nodes associated with the identified beacons that have a link quality satisfying a threshold value based on determining that the number of connected links is below the target connection. At 730, the node may again determine a connection path to the core network exists. For example, the node may again transmit a ping message and listen for a response message from a core network.

At 735, the node may enable beacons and ability to connect on idle radio resources in response to the node determining that it is connected to the core network. The idle radio may be a radio of the node that does not have an active connection with another node. The node may also enable beacons and an ability to establish a connection on a subset of radio resources. Alternatively, at 740, the node may disable beacons and an ability to connect.

Figure 8:
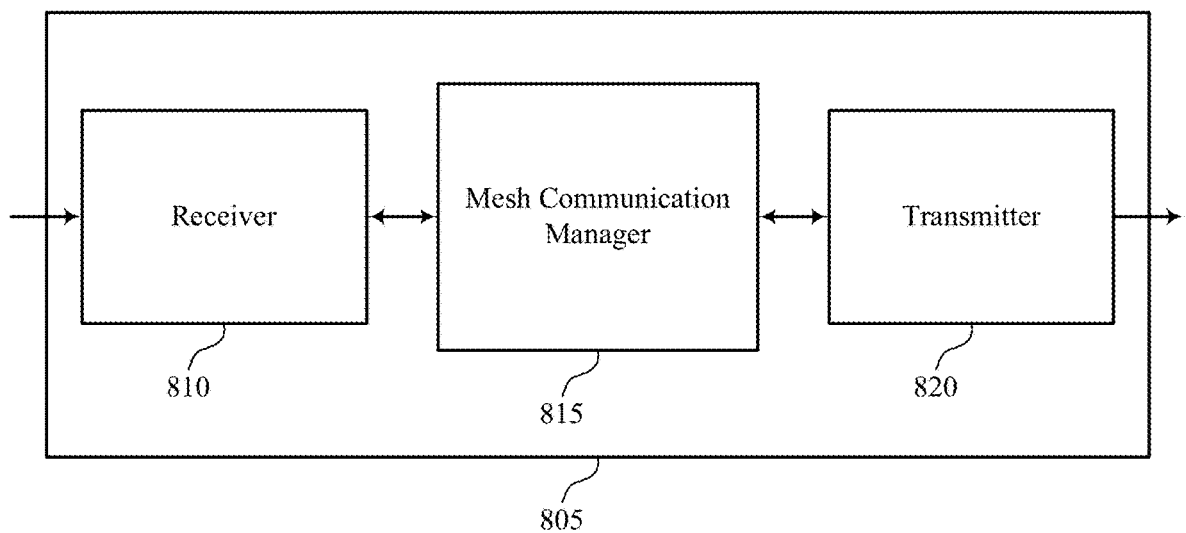
FIGS. 8 through 10 show block diagrams of a device that supports autonomous mesh topology in accordance with aspects of the present disclosure.

FIG. 8 shows a block diagram 800 of a wireless device 805 that supports autonomous mesh topology in accordance with aspects of the present disclosure. Wireless device 805 may be an example of aspects of a node 115 as described with reference to FIG. 1. Wireless device 805 may include receiver 810, mesh communication manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to autonomous mesh topology, etc.). Information may be passed on to other components of the device. Receiver 810 may receive, at a second node, a beacon signal from a first node connected to a core network. The receiver 810 may be an example of aspects of the transceiver 1135 described with reference to FIG. 11. The receiver 810 may utilize a single antenna or a plurality of antennas.

Mesh communication manager 815 and/or at least some of its various sub-components may be implemented in hardware, software executed by a processor, firmware, or any combination thereof. If implemented in software executed by a processor, the functions of the mesh communication manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The mesh communication manager 815 and/or at least some of its various sub-components may be physically located at various positions, including being distributed such that portions of functions are implemented at different physical locations by one or more physical devices. In some examples, mesh communication manager 815 and/or at least some of its various sub-components may be a separate and distinct component in accordance with various aspects of the present disclosure. In other examples, mesh communication manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Mesh communication manager 815 may broadcast, from a first node connected to a core network, a beacon signal, receive a connection establishment request from a second node in response to the broadcasted beacon signal, determine a radio resource availability associated with a plurality of radios of the first node based on the connection establishment request, where the radio resource availability includes a number of active connections associated with one or more radios of the plurality of radios of the first node, and establish a connection with the second node using a radio of the plurality of radios based on determining the radio resource availability. The mesh communication manager 815 may also determine, in response to the received beacon signal, a radio resource availability associated with a plurality of radios of the second node, where the radio resource availability includes a number of active connections associated with one or more radios of the plurality of radios of the second node, transmit a connection establishment request from the second node to the first node based on the radio resource availability of the second node, and establish a connection with the first node using a radio of the plurality of radios based on the connection establishment request.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a plurality of antennas.

Figure 9:
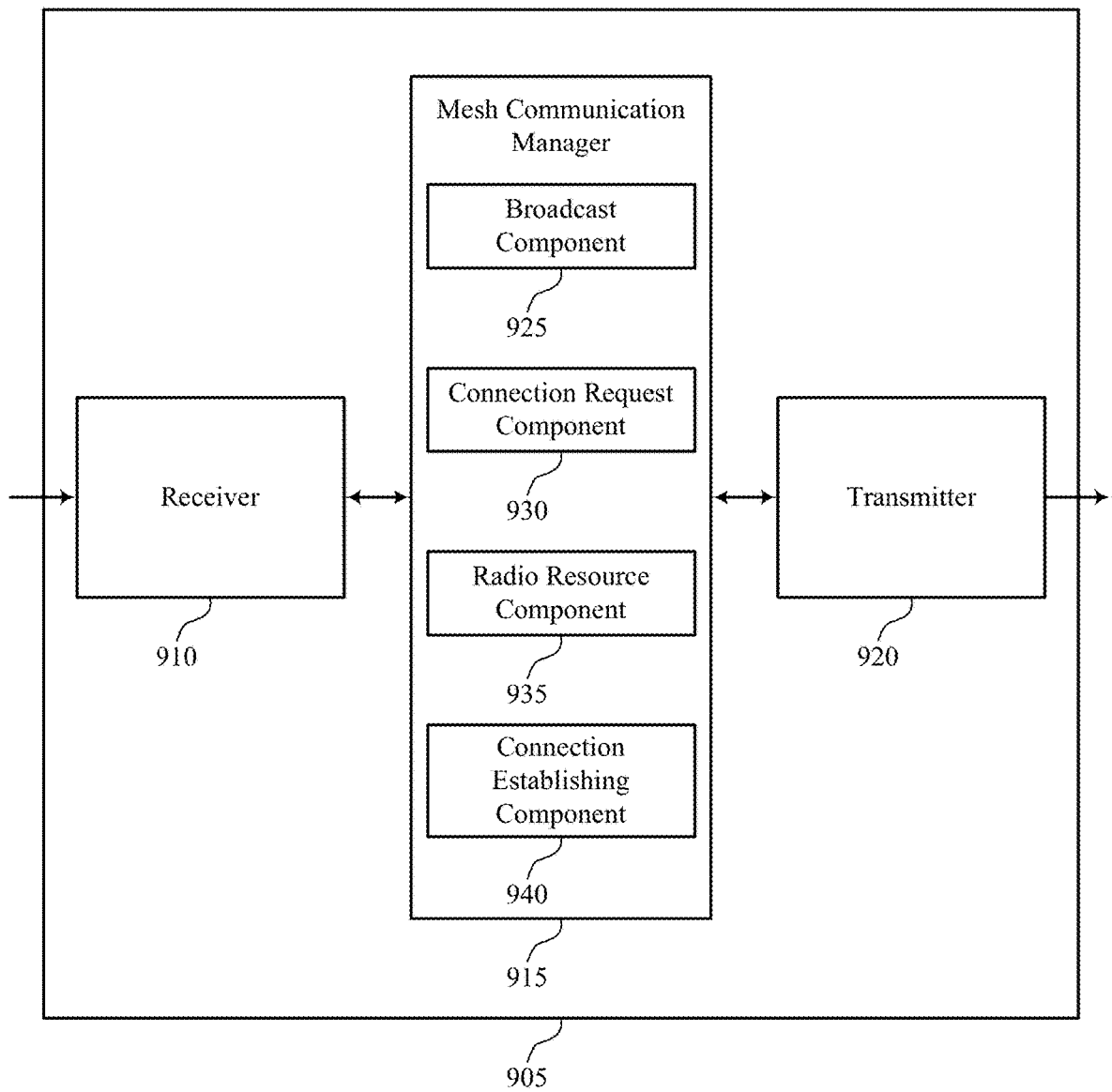

FIG. 9 shows a block diagram 900 of a wireless device 905 that supports autonomous mesh topology in accordance with aspects of the present disclosure. Wireless device 905 may be an example of aspects of a wireless device 805 or a node 115 as described with reference to FIGS. 1 and 8. Wireless device 905 may include receiver 910, mesh communication manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to autonomous mesh topology, etc.). Information may be passed on to other components of the device. The receiver 910 may be an example of aspects of the transceiver 1135 described with reference to FIG. 11. The receiver 910 may utilize a single antenna or a plurality of antennas.

Mesh communication manager 915 may be an example of aspects of the mesh communication manager 815 described with reference to FIG. 8. Mesh communication manager 915 may also include broadcast component 925, connection request component 930, radio resource component 935, and connection establishing component 940.

Broadcast component 925 may broadcast, from a first node connected to a core network, a beacon signal. Connection request component 930 may receive a connection establishment request from a second node in response to the broadcasted beacon signal and transmit a connection establishment request from the second node to the first node based on the radio resource availability of the second node.

Radio resource component 935 may determine a radio resource availability associated with a plurality of radios of the first node based on the connection establishment request. In some cases, the radio resource availability includes a number of active connections associated with one or more radios of the plurality of radios of the first node. Radio resource component 935 may configure radio resources of the plurality of radios of the second node for establishing a connection with a second BSS. In some examples, radio resource component 935 may identify the radio of the plurality of radios of the first node as available to establish the connection with the second node based on the determining.

Radio resource component 935 may configure resources of the radio of the plurality of radios of the first node for establishing a second connection with a second BSS. In some cases, radio resource component 935 may receive a radio resource configuration from the core network. Alternatively, radio resource component 935 may determine that the number of active radio connections associated with the first node is below a threshold number. In some cases, radio resource component 935 may determine, in response to the received beacon signal, a radio resource availability associated with a plurality of radios of the second node. The radio resource availability may include a number of active connections associated with one or more radios of the plurality of radios of the second node. Radio resource component 935 may determine that the number of active radio connections associated with the second node is below a threshold number. In some cases, radio resource component 935 may identify the radio of the plurality of radios of the second node as available to establish the connection with the first node based on the determining. Additionally or alternatively, radio resource component 935 may determine that the number of active radio connections associated with the second node is above a threshold number, and configure the radio resource availability of the radio of the plurality of radios of the first node based on the received radio resource configuration.

Connection establishing component 940 may establish a connection with the second node using a radio of the plurality of radios based on determining the radio resource availability. Connection establishing component 940 may also form a mesh BSS including the first BSS and the second BSS based on the second connection. In some examples, forming the mesh BSS may include linking the first BSS and the second BSS at a network layer (e.g., layer 3). Connection establishing component 940 may establish a second connection between the first node and the selected node. Alternatively, connection establishing component 940 may terminate the established connection between the first node and the second node or the established second connection between the first node and the selected node based on the active link quality of the connection exceeding a threshold value or the second connection exceeding the threshold value.

Connection establishing component 940 may form a first BSS including the first node and the second node based on establishing the connection. The first node may be a control point of the first BSS. Connection establishing component 940 may establish the second connection with the third node based on the received second beacon signal. Additionally or alternatively, connection establishing component 940 may establish a connection with the first node using a radio of the plurality of radios based on the connection establishment request. Connection establishing component 940 may establish a second connection between the second node and the selected node.

Connection establishing component 940 may also refrain from establishing the second connection with the selected node based on the determining In some examples, the connection establishing component 940 may identify that the first node is connected to the second node via another radio of the plurality of radios; and discard the establishment request from the second node based on the identifying. In some examples, connection establishing component 940 may determine a lack of a connection to the core network based on the established connection with the first node. The connection establishing component 940 may end the established connection with the first node based on determining the lack of the connection to the core network. Connection establishing component 940 may form a first BSS including the second node and the first node based on establishing the connection. Alternatively, connection establishing component 940 may establish a second connection with the third node based on the received second beacon signal. In some cases, connection establishing component 940 may determine a connection to the core network based on the established connection with the first node. In some cases, establishing the connection with the second node includes establishing, in response to an establishment connection request of the first node, the connection using the radio.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a plurality of antennas.

Figure 10:
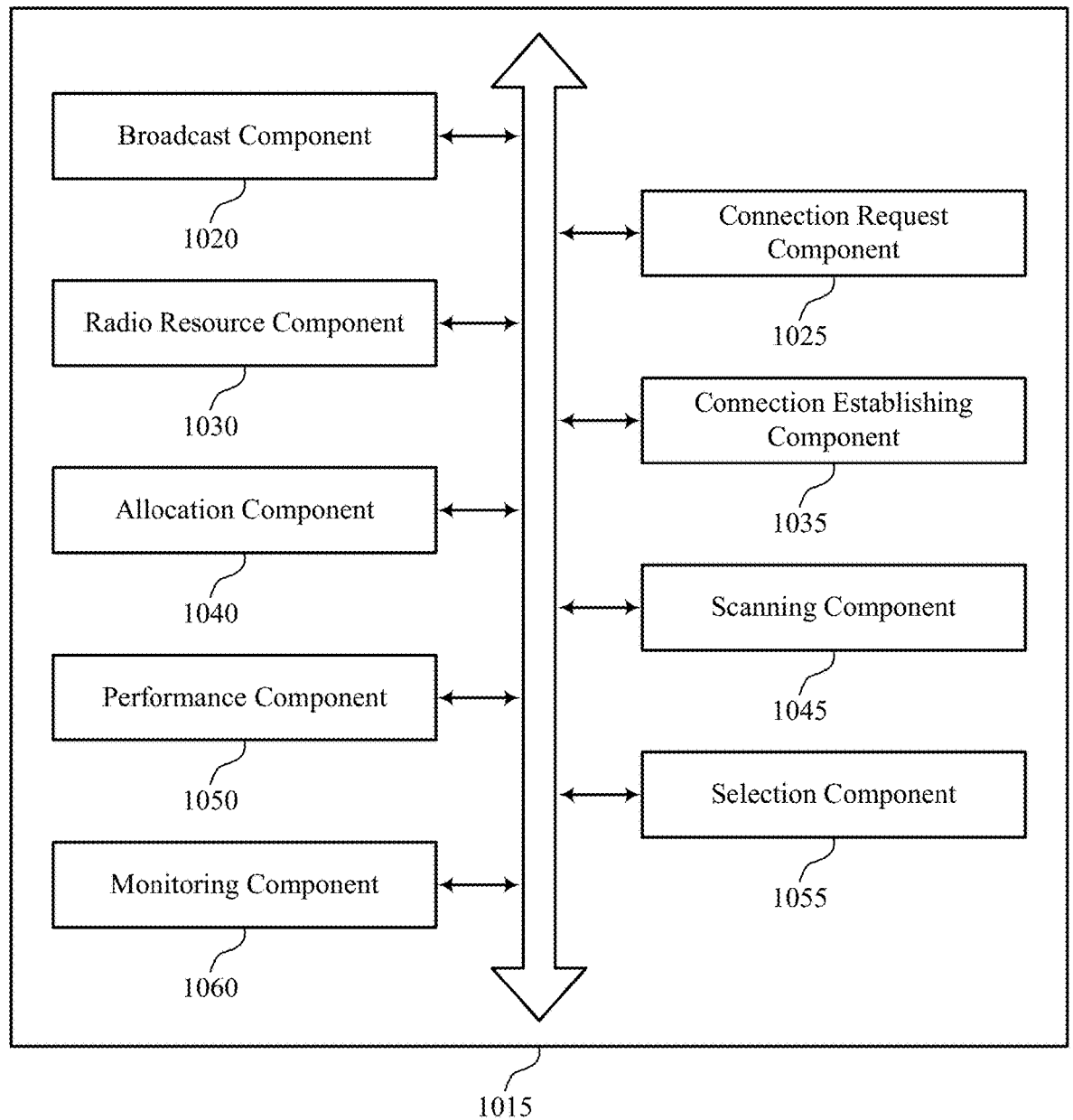

FIG. 10 shows a block diagram 1000 of a mesh communication manager 1015 that supports autonomous mesh topology in accordance with aspects of the present disclosure. The mesh communication manager 1015 may be an example of aspects of a mesh communication manager 815 or a mesh communication manager 915 described with reference to FIGS. 8 and 9. The mesh communication manager 1015 may include broadcast component 1020, connection request component 1025, radio resource component 1030, connection establishing component 1035, allocation component 1040, scanning component 1045, performance component 1050, selection component 1055, and monitoring component 1060. Each of these modules may communicate, directly or indirectly, with one another (e.g., via one or more buses).

Broadcast component 1020 may broadcast, from a first node connected to a core network, a beacon signal. Connection request component 1025 may receive a connection establishment request from a second node in response to the broadcasted beacon signal and transmit a connection establishment request from the second node to the first node based on the radio resource availability of the second node.

Radio resource component 1030 may determine a radio resource availability associated with a plurality of radios of the first node based on the connection establishment request. In some examples, the radio resource availability includes a number of active connections associated with one or more radios of the plurality of radios of the first node. Radio resource component 1030 may configure radio resources of the plurality of radios of the second node for establishing a connection with a second BSS. In some examples, radio resource component 1030 may additionally or alternatively, identify the radio of the plurality of radios of the first node as available to establish the connection with the second node based on the determining. Radio resource component 1030 may configure resources of the radio of the plurality of radios of the first node for establishing a second connection with a second BSS. Radio resource component 1030 may receive a radio resource configuration from the core network. In some examples, radio resource component 1030 may determine that the number of active radio connections associated with the first node is below a threshold number.

Additionally radio resource component 1030 may determine, in response to the received beacon signal, a radio resource availability associated with a plurality of radios of the second node. The radio resource availability may include a number of active connections associated with one or more radios of the plurality of radios of the second node. Radio resource component 1030 may determine that the number of active radio connections associated with the second node is below a threshold number. The radio resource component 1030 may identify the radio of the plurality of radios of the second node as available to establish the connection with the first node based on the determining. Alternatively, radio resource component 1030 may determine that the number of active radio connections associated with the second node is above a threshold number. In some cases, radio resource component 1030 may configure the radio resource availability of the radio of the plurality of radios of the first node based on the received radio resource configuration.

Connection establishing component 1035 may establish a connection with the second node using a radio of the plurality of radios based on determining the radio resource availability. In some cases, connection establishing component 1035 may establish a second connection between the first node and the selected node. Connection establishing component 1035 may terminate the established connection between the first node and the second node or the established second connection between the first node and the selected node based on the active link quality of the connection exceeding a threshold value or the second connection exceeding the threshold value.

Connection establishing component 1035 may establish a connection with the first node using a radio of the plurality of radios based on the connection establishment request. In some examples, connection establishing component 1035 may establish a second connection between the second node and the selected node. Additionally connection establishing component 1035 may refrain from establishing the second connection with the selected node based on the determining. In some examples, the connection establishing component 1035 may identify that the first node is connected to the second node via another radio of the plurality of radios; and discard the establishment request from the second node based on the identifying. In some examples, connection establishing component 1035 may determine a lack of a connection to the core network based on the established connection with the first node, and end the established connection with the first node based on determining the lack of the connection to the core network.

Connection establishing component 1035 may form a first BSS including the first node and the second node based on establishing the connection. In some examples, the first node may be a control point of the first BSS. Connection establishing component 1035 may also form a mesh BSS including the first BSS and the second BSS based on the second connection. In some examples, forming the mesh BSS may include linking the first BSS and the second BSS at a network layer (e.g., layer 3). In some cases, connection establishing component 1035 may establish the second connection with the third node based on the received second beacon signal. Connection establishing component 1035 may form a first BSS including the second node and the first node based on establishing the connection. In some cases, connection establishing component 1035 may establish a second connection with the third node based on the received second beacon signal, and determine a connection to the core network based on the established connection with the first node.

In some cases, the establishing the connection with the second node includes establishing, in response to an establishment connection request of the first node, the connection using the radio. In some cases, connection establishing component 1035 may enable beacon signaling and radio resource availability transmission on an idle radio of the second node based on determining the connection to the core network radio.

Allocation component 1040 may allocate available resources to the identified radio for establishing the connection with the second node based on the identifying. In some examples, establishing the connection may be in response to the allocating. Additionally or alternatively, allocation component 1040 may allocate available resources to the identified radio for establishing the connection with the first node based on the identifying. In some examples, establishing the connection may be in response to the allocating.

Scanning component 1045 may scan for a plurality of beacon signals using the one or more radios of the plurality of radios. In some cases, scanning component 1045 may receive the plurality of beacon signals from a plurality of nodes based on the scanning. Additionally or alternatively, scanning component 1045 may receive a beacon signal from a node in the second BSS. In some examples, the beacon signal may include a request to establish a connection with the first node.

Performance component 1050 may analyze a performance metric of each of the plurality of beacon signals. In some cases, performance component 1050 may determine a potential link quality between the first node and each of the plurality of nodes based on analyzing the performance metric, and determine a potential link quality between the second node and each of the plurality of nodes based on analyzing the performance metric. In some cases, the performance metric includes a CQI, a RSSI, a SNR indicator, or any combination thereof.

Selection component 1055 may select a node of the plurality of nodes based on the potential link quality of the selected node. Monitoring component 1060 may monitor an active link quality between the first node and the second node or the selected node.

Figure 11:
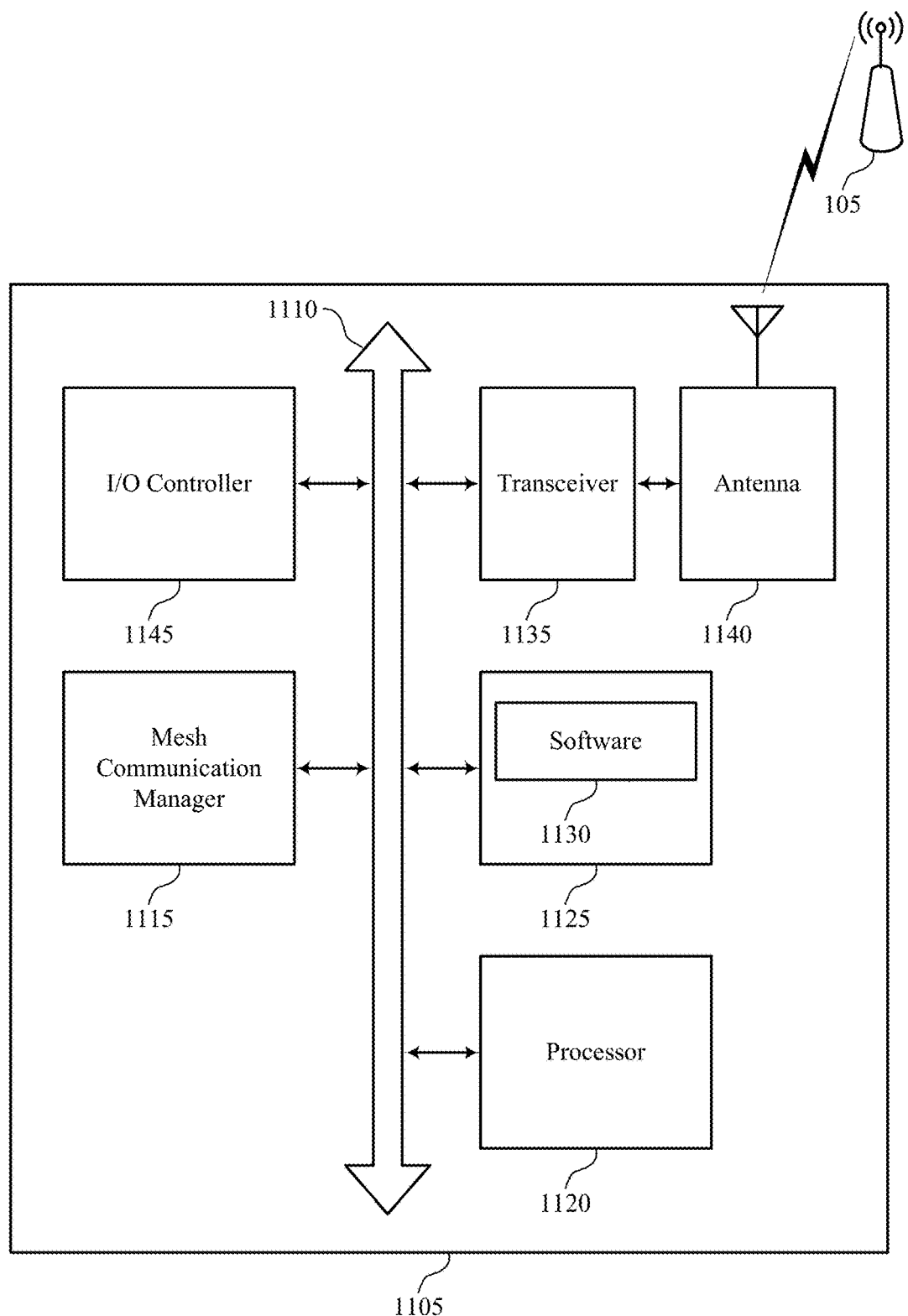
FIG. 11 illustrates a block diagram of a system including a node that supports autonomous mesh topology in accordance with aspects of the present disclosure.

FIG. 11 shows a diagram of a system 1100 including a device 1105 that supports autonomous mesh topology in accordance with aspects of the present disclosure. Device 1105 may be an example of or include the components of wireless device 805, wireless device 905, or a node 115 as described above, e.g., with reference to FIGS. 1, 8 and 9. Device 1105 may include components for bi-directional voice and data communications including components for transmitting and receiving communications, including mesh communication manager 1115, processor 1120, memory 1125, software 1130, transceiver 1135, antenna 1140, and I/O controller 1145. These components may be in electronic communication via one or more busses (e.g., bus 1110).

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting autonomous mesh topology).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware and/or software operation such as the interaction with peripheral components or devices.

Software 1130 may include code to implement aspects of the present disclosure, including code to support autonomous mesh topology. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas. In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
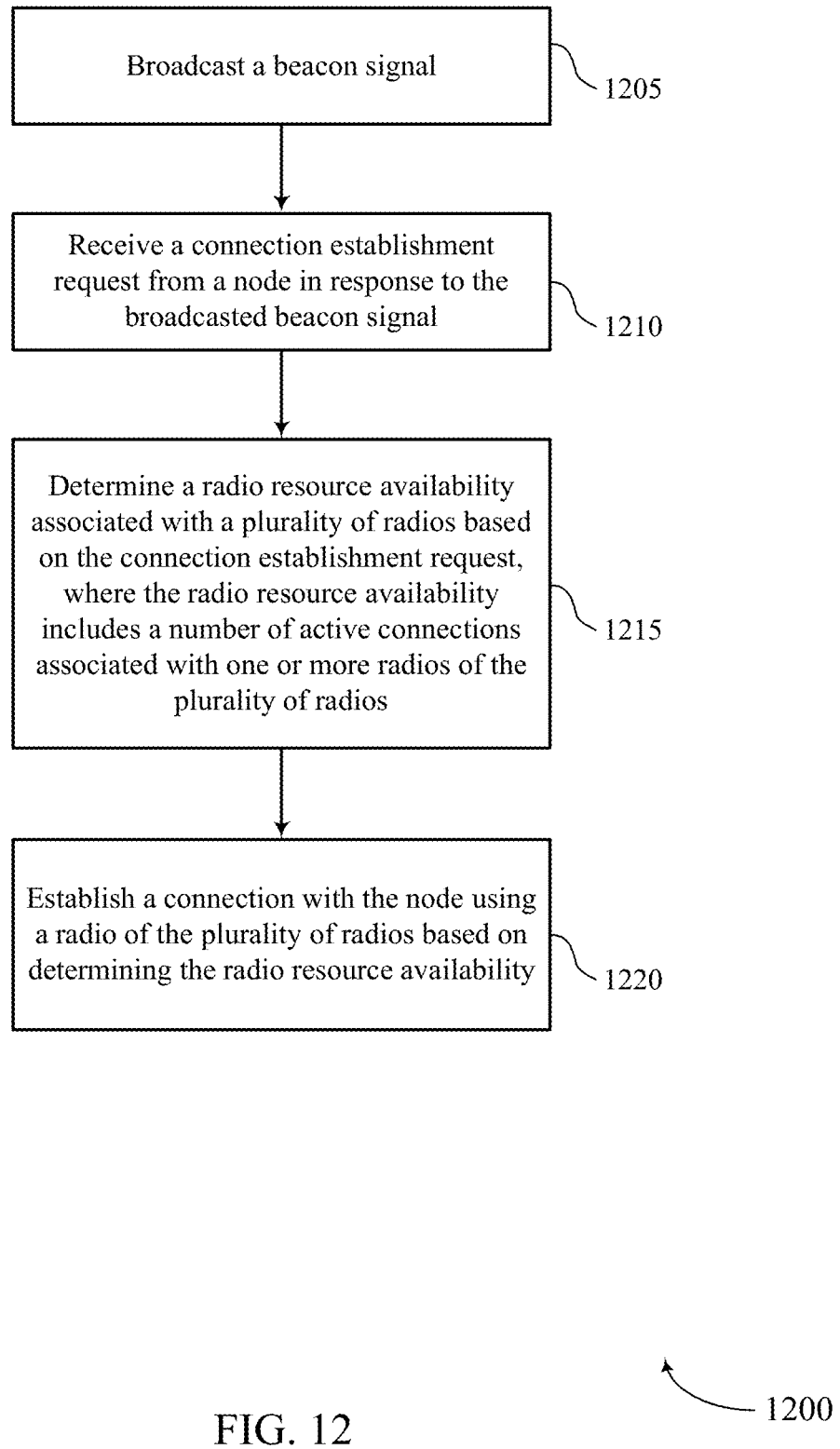
FIGS. 12 through 15 illustrate methods for autonomous mesh topology in accordance with aspects of the present disclosure.

FIG. 12 shows a flowchart illustrating a method 1200 for autonomous mesh topology in accordance with aspects of the present disclosure. The operations of method 1200 may be implemented by a node 115 or its components as described herein. For example, the operations of method 1200 may be performed by a mesh communication manager as described with reference to FIGS. 8 through 11. In some examples, a node 115 may execute a plurality of codes to control the functional elements of the device to perform the functions described below. Additionally or alternatively, the node 115 may perform aspects of the functions described below using special-purpose hardware.

At block 1205 the node 115 may broadcast a beacon signal. In some cases, node 115 may be connected to a core network. The operations of block 1205 may be performed according to the methods described with reference to FIGS. 1 through 7. In certain examples, aspects of the operations of block 1205 may be performed by a broadcast component as described with reference to FIGS. 8 through 11.

At block 1210 the node 115 may receive a connection establishment request from a node in response to the broadcasted beacon signal. In some examples, the node may be a second STA, for example a node within a communication range of node 115. The operations of block 1210 may be performed according to the methods described with reference to FIGS. 1 through 7. In certain examples, aspects of the operations of block 1210 may be performed by a connection request component as described with reference to FIGS. 8 through 11.

At block 1215 the node 115 may determine a radio resource availability associated with a plurality of radios of the node 115 based on the connection establishment request. In some cases, the radio resource availability may include a number of active connections associated with one or more radios of the plurality of radios of the node 115. The operations of block 1215 may be performed according to the methods described with reference to FIGS. 1 through 7. In certain examples, aspects of the operations of block 1215 may be performed by a radio resource component as described with reference to FIGS. 8 through 11.

At block 1220 the node 115 may establish a connection with the node using a radio of the plurality of radios based on determining the radio resource availability. The operations of block 1220 may be performed according to the methods described with reference to FIGS. 1 through 7. In certain examples, aspects of the operations of block 1220 may be performed by a connection establishing component as described with reference to FIGS. 8 through 11.

Figure 13:
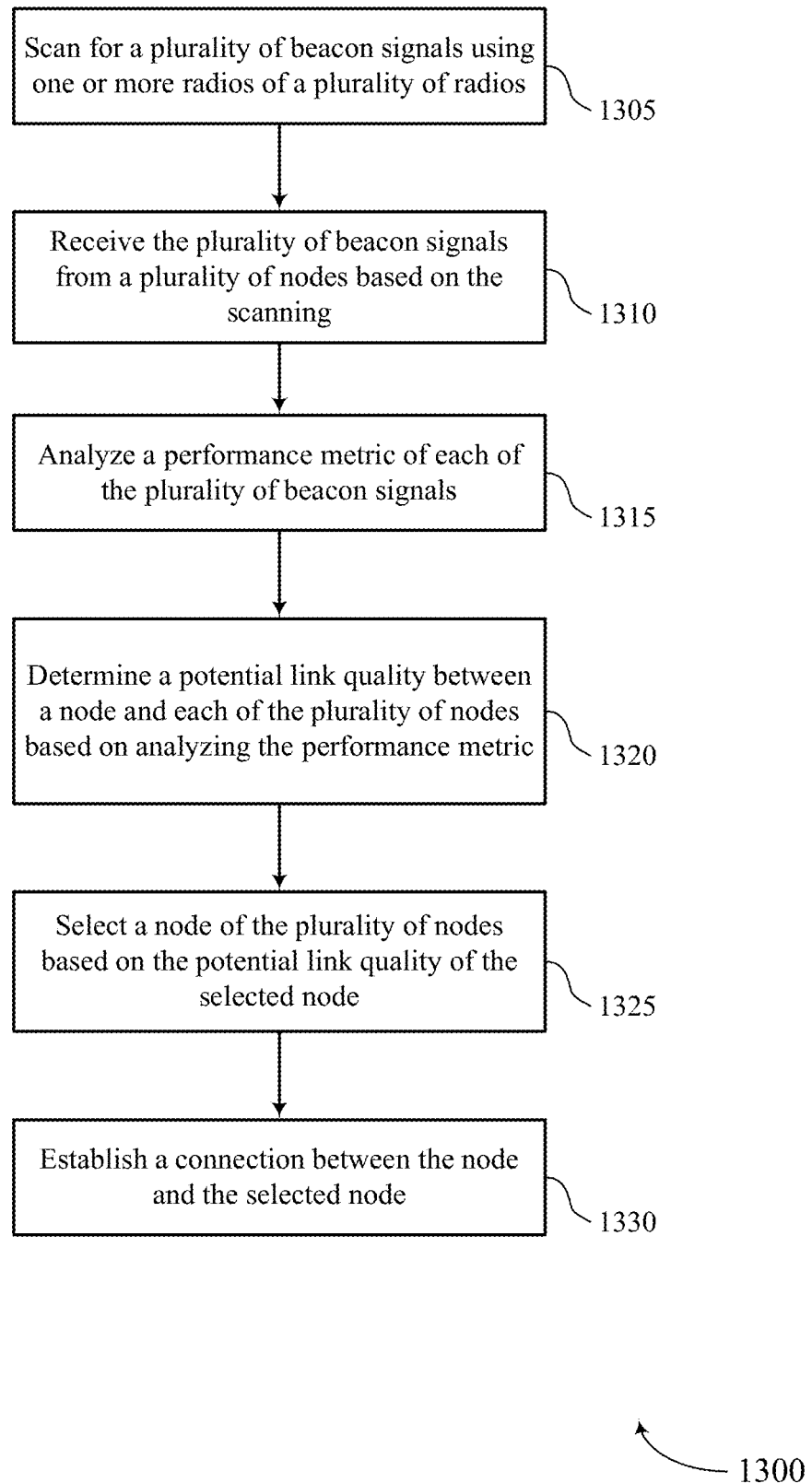

FIG. 13 shows a flowchart illustrating a method 1300 for autonomous mesh topology in accordance with aspects of the present disclosure. The operations of method 1300 may be implemented by a node 115 or its components as described herein. For example, the operations of method 1300 may be performed by a mesh communication manager as described with reference to FIGS. 8 through 11. In some examples, a node 115 may execute a plurality of codes to control the functional elements of the device to perform the functions described below. Additionally or alternatively, the node 115 may perform aspects of the functions described below using special-purpose hardware.

At block 1305 the node 115 may scan for a plurality of beacon signals using the one or more radios of the plurality of radios. The operations of block 1305 may be performed according to the methods described with reference to FIGS. 1 through 7. In certain examples, aspects of the operations of block 1305 may be performed by a scanning component as described with reference to FIGS. 8 through 11.

At block 1310 the node 115 may receive the plurality of beacon signals from a plurality of nodes based on the scanning. The operations of block 1310 may be performed according to the methods described with reference to FIGS. 1 through 7. In certain examples, aspects of the operations of block 1310 may be performed by a scanning component as described with reference to FIGS. 8 through 11.

At block 1315 the node 115 may analyze a performance metric of each of the plurality of beacon signals. The operations of block 1315 may be performed according to the methods described with reference to FIGS. 1 through 7. In certain examples, aspects of the operations of block 1315 may be performed by a performance component as described with reference to FIGS. 8 through 11.

At block 1320 the node 115 may determine a potential link quality between the node 115 and each of the plurality of nodes based on analyzing the performance metric. The operations of block 1320 may be performed according to the methods described with reference to FIGS. 1 through 7. In certain examples, aspects of the operations of block 1320 may be performed by a performance component as described with reference to FIGS. 8 through 11.

At block 1325 the node 115 may select a node of the plurality of nodes based on the potential link quality of the selected node. The operations of block 1325 may be performed according to the methods described with reference to FIGS. 1 through 7. In certain examples, aspects of the operations of block 1325 may be performed by a selection component as described with reference to FIGS. 8 through 11.

At block 1330 the node 115 may establish a connection between the node 115 and the selected node. The operations of block 1330 may be performed according to the methods described with reference to FIGS. 1 through 7. In certain examples, aspects of the operations of block 1330 may be performed by a connection establishing component as described with reference to FIGS. 8 through 11.

Figure 14:
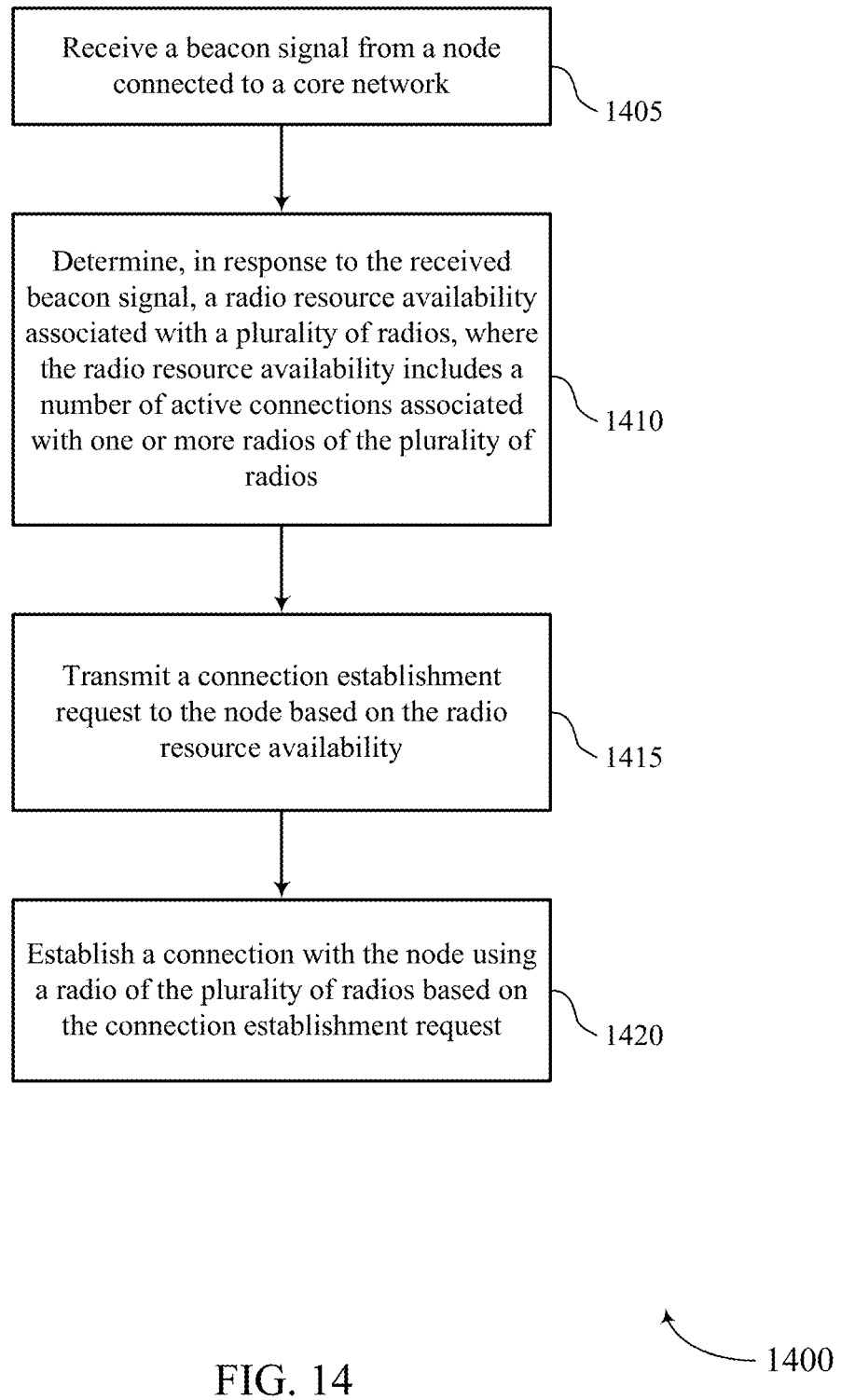

FIG. 14 shows a flowchart illustrating a method 1400 for autonomous mesh topology in accordance with aspects of the present disclosure. The operations of method 1400 may be implemented by a node 115 or its components as described herein. For example, the operations of method 1400 may be performed by a mesh communication manager as described with reference to FIGS. 8 through 11. In some examples, a node 115 may execute a plurality of codes to control the functional elements of the device to perform the functions described below. Additionally or alternatively, the node 115 may perform aspects of the functions described below using special-purpose hardware.

At block 1405 the node 115 may receive a beacon signal from a node connected to a core network. The operations of block 1405 may be performed according to the methods described with reference to FIGS. 1 through 7. In certain examples, aspects of the operations of block 1405 may be performed by a receiver as described with reference to FIGS. 8 through 11.

At block 1410 the node 115 may determine, in response to the received beacon signal, a radio resource availability associated with a plurality of radios of the node 115. In some cases, the radio resource availability may include a number of active connections associated with one or more radios of the plurality of radios of node 115. The operations of block 1410 may be performed according to the methods described with reference to FIGS. 1 through 7. In certain examples, aspects of the operations of block 1410 may be performed by a radio resource component as described with reference to FIGS. 8 through 11.

At block 1415 the node 115 may transmit a connection establishment request from to the node based at least in part on the radio resource availability of the second node. The operations of block 1415 may be performed according to the methods described with reference to FIGS. 1 through 7. In certain examples, aspects of the operations of block 1415 may be performed by a connection request component as described with reference to FIGS. 8 through 11.

At block 1420 the node 115 may establish a connection with the node using a radio of the plurality of radios based on the connection establishment request. The operations of block 1420 may be performed according to the methods described with reference to FIGS. 1 through 7. In certain examples, aspects of the operations of block 1420 may be performed by a connection establishing component as described with reference to FIGS. 8 through 11.

Figure 15:
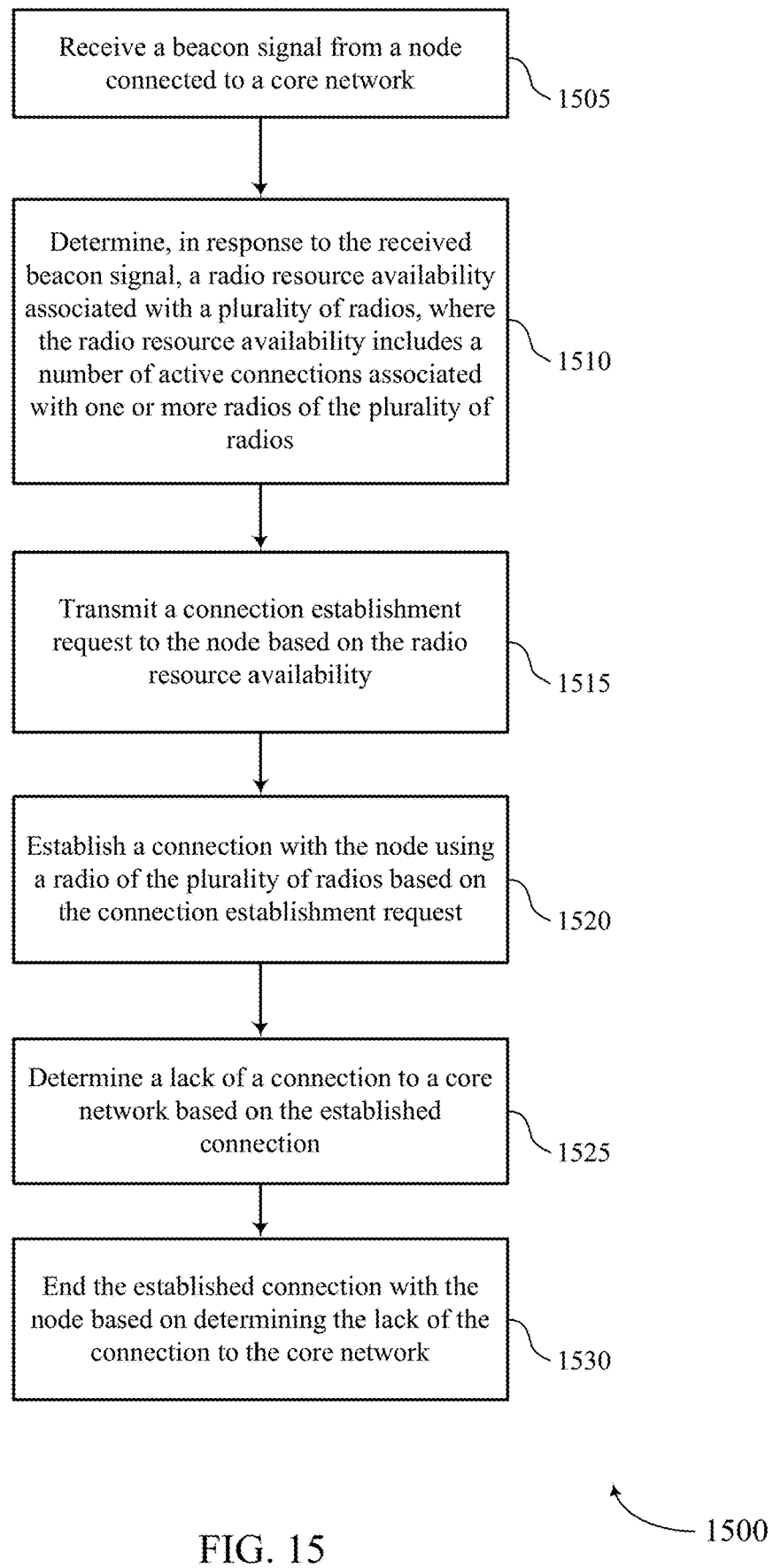

FIG. 15 shows a flowchart illustrating a method 1500 for autonomous mesh topology in accordance with aspects of the present disclosure. The operations of method 1500 may be implemented by a node 115 or its components as described herein. For example, the operations of method 1500 may be performed by a mesh communication manager as described with reference to FIGS. 8 through 11. In some examples, a node 115 may execute a plurality of codes to control the functional elements of the device to perform the functions described below. Additionally or alternatively, the node 115 may perform aspects of the functions described below using special-purpose hardware.

At block 1505 the node 115 may receive a beacon signal from a node connected to a core network. The operations of block 1505 may be performed according to the methods described with reference to FIGS. 1 through 7. In certain examples, aspects of the operations of block 1505 may be performed by a receiver as described with reference to FIGS. 8 through 11.

At block 1510 the node 115 may determine, in response to the received beacon signal, a radio resource availability associated with a plurality of radios of node 115. In some cases, the radio resource availability may include a number of active connections associated with one or more radios of the plurality of radios of node 115. The operations of block 1510 may be performed according to the methods described with reference to FIGS. 1 through 7. In certain examples, aspects of the operations of block 1510 may be performed by a radio resource component as described with reference to FIGS. 8 through 11.

At block 1515 the node 115 may transmit a connection establishment request from to the node based on the radio resource availability of node 115. The operations of block 1515 may be performed according to the methods described with reference to FIGS. 1 through 7. In certain examples, aspects of the operations of block 1515 may be performed by a connection request component as described with reference to FIGS. 8 through 11.

At block 1520 the node 115 may establish a connection with the node using a radio of the plurality of radios based on the connection establishment request. The operations of block 1520 may be performed according to the methods described with reference to FIGS. 1 through 7. In certain examples, aspects of the operations of block 1520 may be performed by a connection establishing component as described with reference to FIGS. 8 through 11.

At block 1525 the node 115 may determine a lack of a connection to a core network based on the established connection with the STA. The operations of block 1525 may be performed according to the methods described with reference to FIGS. 1 through 7. In certain examples, aspects of the operations of block 1525 may be performed by a connection establishing component as described with reference to FIGS. 8 through 11.

At block 1530 the node 115 may end the established connection with the node based on determining the lack of the connection to the core network. The operations of block 1530 may be performed according to the methods described with reference to FIGS. 1 through 7. In certain examples, aspects of the operations of block 1530 may be performed by a connection establishing component as described with reference to FIGS. 8 through 11.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the nodes may have similar frame timing, and transmissions from different nodes may be approximately aligned in time. For asynchronous operation, the nodes may have different frame timing, and transmissions from different nodes may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, system 100 and 200 of FIGS. 1 and 2—may include one or more carriers, where each carrier may be a signal made up of multiple sub-carriers (e.g., waveform signals of different frequencies).

The description plurality forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed plurality of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of forming a mesh network for wireless communication, comprising:
   broadcasting, from a first node connected to a core network, a beacon signal;
   receiving a connection establishment request from a second node in response to the broadcasted beacon signal;
   determining a radio resource availability associated with a plurality of radios of the first node based at least in part on the connection establishment request, wherein the radio resource availability comprises a number of active connections associated with one or more radios of the plurality of radios of the first node;
   identifying a radio of the plurality of radios of the first node as available to establish a connection with the second node based at least in part on determining that the number of active radio connections is below a predetermined number of radio connections comprising a threshold number, wherein the threshold number determines a redundancy associated with the first node and the second node; and
   establishing the connection with the second node using the radio of the plurality of radios on available resources allocated for the radio of the plurality of radios.

2. The method of claim 1, wherein establishing the connection with the second node comprises establishing, in response to an establishment connection request of the first node, the connection using the radio.

3. The method of claim 1, further comprising:
   scanning for a plurality of beacon signals using the one or more radios of the plurality of radios; and
   receiving the plurality of beacon signals from a plurality of nodes based at least in part on the scanning.

4. The method of claim 3, further comprising:
   analyzing a performance metric of each of the plurality of beacon signals;
   determining a potential link quality between the first node and each of the plurality of nodes based at least in part on analyzing the performance metric;
   selecting a node of the plurality of nodes based at least in part the potential link quality of the selected node; and
   establishing a second connection between the first node and the selected node.

5. The method of claim 4, further comprising:
   monitoring an active link quality between the first node and the second node or the selected node; and
   terminating the established connection between the first node and the second node or the established second connection between the first node and the selected node based at least in part on the active link quality of the connection exceeding a threshold value or the active link quality of the second connection exceeding the threshold value.

6. The method of claim 1, further comprising:
   identifying selected links between each of a plurality of nodes;
   identifying a performance metric of each of the selected links;
   generating a routing algorithm associated with the mesh network based at least in part on the selected links and the performance metric of each of the selected links.

7. The method of claim 1, further comprising:
   forming a first basic service plurality (BSS) comprising the first node and the second node based at least in part on establishing the connection, wherein the first node is a control point of the first BSS.

8. The method of claim 7, further comprising:
   configuring resources of the radio of the plurality of radios of the first node for establishing a second connection with a second BSS;
   receiving, via the radio, a second beacon signal from a third node in the second BSS;
   establishing the second connection with the third node based at least in part on the received second beacon signal; and
   forming a BSS mesh comprising the first BSS and the second BSS based at least in part on the second connection, wherein forming the BSS mesh comprises linking the first BSS and the second BSS at a network layer.

9. The method of claim 1, further comprising:
receiving a radio resource configuration from the core network; and
configuring the radio resource availability of the radio of the plurality of radios of the first node based at least in part on the received radio resource configuration.

10. The method of claim 1, wherein receiving the connection establishment request from the second node further comprises:
identifying that the first node is connected to the second node via another radio of the plurality of radios; and
discarding the establishment request from the second node based at least in part on the identifying.

11. A method of forming a mesh network for wireless communication, comprising:
receiving, at a second node, a beacon signal from a first node connected to a core network;
determining, in response to the received beacon signal, a radio resource availability associated with a plurality of radios of the second node, wherein the radio resource availability comprises a number of active connections associated with one or more radios of the plurality of radios of the second node;
identifying a radio of the plurality of radios of the second node as available to establish a connection with the first node based at least in part on determining that the number of active radio connections is below a predetermined number of radio connections comprising a threshold number, wherein the threshold number determines a redundancy associated with the first node and the second node; and
transmitting a connection establishment request from the second node to the first node based at least in part on the radio resource availability of the second node; and
establishing the connection with the first node using the radio of the plurality of radios on available resources allocated for the radio of the plurality of radios based at least in part on the connection establishment request.

12. The method of claim 11, further comprising:
determining a connection to the core network based at least in part on the established connection with the first node; and
enabling beacon signaling and radio resource availability transmission on an idle radio of the second node based at least in part on determining the connection to the core network.

13. The method of claim 11, further comprising:
analyzing a performance metric of each of a plurality of beacon signals;
determining a potential link quality between the second node and each of a plurality of nodes associated with the plurality of beacon signals based at least in part on analyzing the performance metric;
selecting a node of the plurality of nodes based at least in part on the potential link quality of the selected node; and
establishing a second connection between the second node and the selected node.

14. The method of claim 13, further comprising:
determining that the number of active radio connections associated with the second node is above the predetermined number of radio connections comprising the threshold number; and refraining from establishing the second connection with the selected node based at least in part on the determining.

15. The method of claim 14, wherein the performance metric comprises a channel quality indicator (CQI), a received signal strength indicator (RSSI), a signal-to-noise-ratio (SNR) indicator, or any combination thereof.

16. The method of claim 11, further comprising:
determining a lack of a connection to the core network based at least in part on the established connection with the first node; and
ending the established connection with the first node based at least in part on determining the lack of the connection to the core network.

17. The method of claim 16, further comprising:
scanning for a plurality of beacon signals using one or more radios of a plurality of radios; and
receiving a plurality of beacon signals from a plurality of nodes based at least in part on the scanning.

18. The method of claim 11, further comprising:
forming a first basic service plurality (BSS) comprising the second node and the first node based at least in part on establishing the connection, wherein forming the first BSS based at least in part on a first radio of the plurality of radios of the first node operating in an access point mode and a first radio of the plurality of radios of the second node operating in a station mode;
configuring radio resources of the plurality of radios of the second node for establishing a connection with a second BSS;
receiving, via a second radio of the plurality of radios, a second beacon signal from a first radio of a third node in the second BSS, wherein the first radio of the third node is in an access point mode and the second radio of the second node is in the station mode;
establishing a second connection with the third node based at least in part on the received second beacon signal; and
forming a BSS mesh comprising the first BSS and the second BSS based at least in part on the second, wherein forming the BSS mesh comprises linking the first BSS and the second BSS at layer 3.

19. An apparatus for wireless communication, comprising:
a processor;
memory in electronic communication with the processor; and
the processor and memory configured to:
broadcast, from the apparatus connected to a core network, a beacon signal;
receive a connection establishment request from a second apparatus in response to the broadcasted beacon signal;
determine a radio resource availability associated with a plurality of radios of the apparatus based at least in part on the connection establishment request, wherein the radio resource availability comprises a number of active connections associated with one or more radios of the plurality of radios of the apparatus;
identify a radio of the plurality of radios of the first node as available to establish a connection with the second node based at least in part on determining that the number of active radio connections is below a predetermined number of radio connections comprising a threshold number, wherein the threshold number determines a redundancy associated with the first node and the second node; and establish the connection with the second node using the radio of the plurality of radios on available resources allocated for the radio of the plurality of radios.

* * * * *